(12) United States Patent
Jiang et al.

(10) Patent No.: US 11,477,778 B2
(45) Date of Patent: Oct. 18, 2022

(54) PHYSICAL DOWNLINK CONTROL CHANNEL MONITORING METHOD, USER EQUIPMENT AND NETWORK SIDE DEVICE

(71) Applicant: VIVO MOBILE COMMUNICATION CO., LTD., Guangdong (CN)

(72) Inventors: Dajie Jiang, Chang'an Dongguan (CN); Kai Wu, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 107 days.

(21) Appl. No.: 17/068,689

(22) Filed: Oct. 12, 2020

(65) Prior Publication Data
US 2021/0029683 A1    Jan. 28, 2021

Related U.S. Application Data

(63) Continuation of application No. PCT/CN2019/080100, filed on Mar. 28, 2019.

(30) Foreign Application Priority Data

Apr. 13, 2018   (CN) .......................... 201810333779.7

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 24/08* (2013.01); *H04W 72/0446* (2013.01)

(58) Field of Classification Search
CPC ............... H04W 72/042; H04W 52/02; H04W 52/0225; H04L 1/0038; H04L 5/0053
See application file for complete search history.

(56) References Cited

U.S. PATENT DOCUMENTS

2014/0293843 A1* 10/2014 Papasakellariou .... H04L 5/0037
                                                   370/280
2015/0189574 A1*  7/2015 Ng ......................... H04W 24/08
                                                   370/254
(Continued)

FOREIGN PATENT DOCUMENTS

CN   101795461 A   8/2010
CN   101841892 A   9/2010
(Continued)

OTHER PUBLICATIONS

CN Office Action in Application No. 201810333779.7 dated May 8, 2020.
(Continued)

*Primary Examiner* — Diane L Lo
*Assistant Examiner* — Abusayeed M Haque
(74) *Attorney, Agent, or Firm* — Maschoff Brennan

(57) ABSTRACT

The present disclosure provides a PDCCH monitoring method, a UE and a network side device. The PDCCH monitoring method includes: acquiring one or more bits in DCI transmitted through a first PDCCH monitored by the UE, the one or more bits in the DCI of the first PDCCH indicating a PDCCH not to be monitored and/or a PDCCH to be monitored; and determining the PDCCH not to be monitored and/or the PDCCH to be monitored in accordance with the one or more bits in the DCI of the first PDCCH.

20 Claims, 4 Drawing Sheets

(51) Int. Cl.
*H04W 52/02* (2009.01)
*H04W 24/08* (2009.01)

(56) References Cited

U.S. PATENT DOCUMENTS

| | | | |
|---|---|---|---|
| 2015/0305029 A1 | | 10/2015 | Rao et al. |
| 2016/0044638 A1 | | 2/2016 | Gao et al. |
| 2016/0345311 A1 | * | 11/2016 | Chen .................. H04L 5/00 |
| 2017/0078079 A1 | * | 3/2017 | Papasakellariou ......................... H04W 72/0446 |
| 2018/0143032 A1 | | 5/2018 | Rosario |
| 2018/0270790 A1 | | 9/2018 | Shi et al. |
| 2019/0281481 A1 | | 9/2019 | Shen |
| 2019/0356424 A1 | | 11/2019 | Urabayashi et al. |

FOREIGN PATENT DOCUMENTS

| | | | | |
|---|---|---|---|---|
| CN | 102821479 | A | 12/2012 | |
| CN | 103002477 | A | 3/2013 | |
| CN | 108141829 | * | 3/2016 | ............ H04L 5/001 |
| CN | 106160972 | A | 11/2016 | |
| CN | 106454901 | A | 2/2017 | |
| CN | 114040476 | * | 2/2018 | ............ H04W 52/02 |
| CN | 110351032 | * | 4/2018 | ........... H04L 5/0005 |
| EP | 2 871 883 | A1 | 5/2015 | |
| JP | WO 2012042889 | * | 4/2012 | ............. H04L 5/007 |
| JP | WO-2012042889 | * | 4/2012 | ............. H04L 5/007 |
| JP | 2015525998 | A | 9/2015 | |
| WO | 2010124444 | A1 | 11/2010 | |
| WO | 2017101102 | A1 | 6/2017 | |
| WO | 2018143032 | A1 | 8/2018 | |

OTHER PUBLICATIONS

"Views on contents of group-common PDCCH", NTT DOCOMO, Inc., 3GPP TSG RAN WG1 Meeting #89, R1-1708468, May 15, 2017.

Written Opinion and International Search Report in Application No. PCT/CN2019/080100 dated Oct. 22, 2020.

EP Search Report in Application No. 19785539.8 dated May 12, 2021.

"Power consumption reduction for physical channels for MTC" 3GPP TSG RAN WG1 Meeting #90bis, R1-1717210, ZTE, Sanechips, Oct. 9, 2017.

JP Office Action in Application No. 2020-556300 dated Nov. 29, 2021.

* cited by examiner

PHYSICAL DOWNLINK CONTROL CHANNEL MONITORING METHOD, USER EQUIPMENT AND NETWORK SIDE DEVICE

CROSS-REFERENCE TO RELATED APPLICATION

The present application is a continuation of PCT Application No. PCT/CN2019/080100 filed on Mar. 28, 2019, which claims a priority of the Chinese patent application No. 201810333779.7 filed in China on Apr. 13, 2018, which is incorporated herein by reference in its entirety.

TECHNICAL FIELD

The present disclosure relates to the field of communications technology, in particular to a physical downlink control channel (Physical Downlink Control Channel, PDCCH) monitoring method, a user equipment (User Equipment, UE), and a network side device.

BACKGROUND

Currently, in a long term evolution (Long Term Evolution, LTE) technology and a fifth-generation (Fifth-Generation, 5G) new radio (New Radio, NR) technology, PDCCH blind detection is usually performed by a user equipment (User Equipment, UE) within each subframe or slot. Upon the receipt of a PDCCH belonging to the UE, the UE may receive downlink data or transmit uplink data on a time-frequency resource indicated in the PDCCH. When the PDCCH belonging to the UE fails to be received, the UE may continue to perform the PDCCH blind detection within a next subframe or slot, or within a subframe or slot that meets a PDCCH monitoring periodicity and an offset value configured by a base station.

For many popular services such as Wechat and web browser, an arrival time of a service packet is random or non-uniform. In an actual network, when the UE is in an activated state and monitors the PDCCH continuously, the UE fails to receive the PDCCH for scheduling the UE within all subframes or slots. A behavior of performing, by the UE, the PDCCH blind detection within the slots or subframes without the PDCCH for scheduling the UE may lead to additional power consumption for the UE. Hence, there is an urgent need to solve the above-mentioned problem.

SUMMARY

In one aspect, the present disclosure provides in some embodiments a PDCCH monitoring method for a UE, including: acquiring one or more bits in downlink control information (Downlink Control Information, DCI) transmitted through a first PDCCH monitored by the UE, the one or more bits in the DCI of the first PDCCH indicating a PDCCH not to be monitored and/or a PDCCH to be monitored; and determining the PDCCH not to be monitored and/or the PDCCH to be monitored in accordance with the one or more bits in the DCI of the first PDCCH.

In another aspect, the present disclosure provides in some embodiments a PDCCH configuration method for a network side device, including configuring one or more bits in DCI transmitted through a first PDCCH, the one or more bits in the DCI of the first PDCCH indicating a PDCCH not to be monitored by a UE and/or a PDCCH to be monitored by the UE.

In yet another aspect, the present disclosure provides in some embodiments a UE, including: an acquisition module configured to acquire one or more bits in DCI transmitted through a first PDCCH monitored by the UE, the one or more bits in the DCI of the first PDCCH indicating a PDCCH not to be monitored and/or a PDCCH to be monitored; and a determination module configured to determine the PDCCH not to be monitored and/or the PDCCH to be monitored in accordance with the one or more bits in the DCI of the first PDCCH.

In still yet another aspect, the present disclosure provides in some embodiments a network side device, including a configuration module configured to configure one or more bits in DCI transmitted through a first PDCCH, the one or more bits in the DCI of the first PDCCH indicating a PDCCH not to be monitored by a UE and/or a PDCCH to be monitored by the UE.

In still yet another aspect, the present disclosure provides in some embodiments a UE, including a processor, a memory, and a computer program stored in the memory and executed by the processor. The processor is configured to execute the computer program so as to implement the above-mentioned PDCCH monitoring method.

In still yet another aspect, the present disclosure provides in some embodiments a network side device, including a processor, a memory, and a computer program stored in the memory and executed by the processor. The processor is configured to execute the computer program so as to implement the above-mentioned PDCCH configuration method.

In still yet another aspect, the present disclosure provides in some embodiments a computer-readable storage medium storing therein a computer program. The computer program is executed by the processor so as to implement the above-mentioned PDCCH configuration method.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

In order to make the objects, the technical solutions and the advantages of the present disclosure more apparent, the present disclosure will be described hereinafter in a clear manner in conjunction with the drawings and embodiments. Obviously, the following embodiments merely relate to a part of, rather than all of, the embodiments of the present disclosure, and based on these embodiments, a person skilled in the art may obtain the other embodiments, which also fall within the scope of the present disclosure.

Such terms as "include" or "including" or any other variations involved in the specification and the appended claims intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B.

In the embodiments of the present disclosure, such expressions as "illustratively" and "for example" are merely used to show examples or explanations. Any illustrative embodiment or scheme in the embodiments of the present disclosure shall not be construed as being superior over the other embodiment or scheme. Definitely, these words intend to exhibit relevant concepts in a concrete manner.

The present disclosure will be described hereinafter in conjunction with the drawings. A PDCCH monitoring method, a UE and a network side device involved in the embodiments of the present disclosure may be applied to a wireless communications system. The wireless communications system may be a 5G system, an evolved long term evolution (Evolved Long Term Evolution, eLTE) system, or a subsequently evolved communications system.

Figure 1:
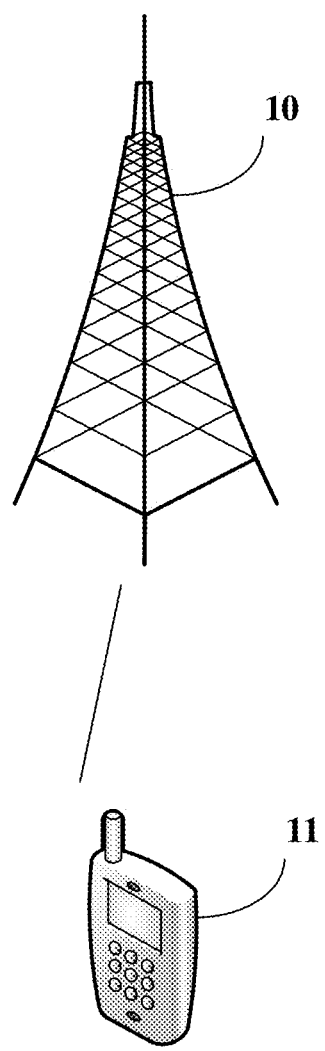
FIG. 1 is a schematic view showing architecture of a wireless communications system according to one embodiment of the present disclosure.

FIG. 1 is a schematic view showing architecture of a wireless communications system according to one embodiment of the present disclosure. As shown in FIG. 1, the wireless communications system may include a network side device 10 and a UE. For example, the UE may be marked as UE 11 which is capable of communicating with the network side device 10. In actual use, the devices may be connected to each other in a wireless manner A solid line is used in FIG. 1 to conveniently and intuitively show a connection relationship between the devices.

It should be appreciated that, the communications system may include a plurality of UEs, and the network side device may communicate with the plurality of UEs (transmit signaling or data).

The network side device 10 in the embodiments of the present disclosure may be a base station. The base station may be a common base station, an evolved node base station (eNB), or a network side device (e.g., next generation node base station (gNB) or transmission and reception point (Transmission And Reception Point, TRP) or a cell in a 5G system.

The UE in the embodiments of the present disclosure may be a mobile point, a flat-panel computer, a laptop computer, an ultra-mobile personal computer (Ultra-Mobile Personal Computer, UMPC), a netbook, or a personal digital assistant (Personal Digital Assistant, PDA), etc.

It should be appreciated that, a slot involved in the context may be a normal slot, e.g., a normal slot consisting of 14 time-domain symbols, or a mini slot consisting of less than 14, e.g., 2, 4 or 7, time-domain symbols.

Of course, the slot involved in the context may also be a transmission time interval (Transmission Time Interval, TTI), a subframe, or a time-domain scheduling granularity.

Figure 2:
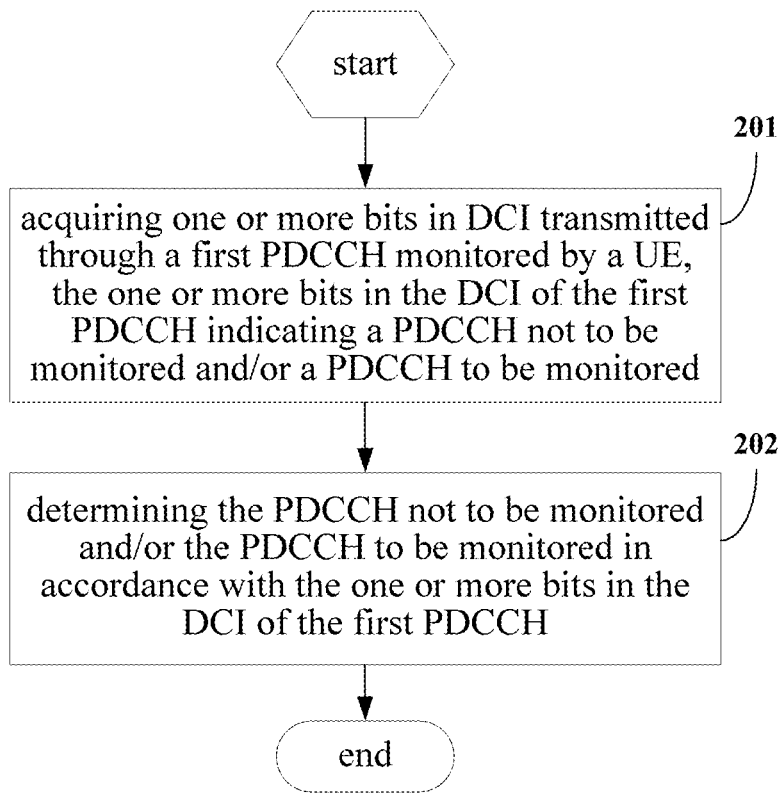
FIG. 2 is a flow chart of a PDCCH monitoring method according to one embodiment of the present disclosure.

As shown in FIG. 2, the present disclosure provides in some embodiments a PDCCH monitoring method executed by a UE, which includes: Step 201 of acquiring one or more bits in DCI transmitted through a first PDCCH monitored by the UE, the one or more bits in the DCI transmitted through the first PDCCH indicating a PDCCH not to be monitored and/or a PDCCH to be monitored; and Step 202 of determining the PDCCH not to be monitored and/or the PDCCH to be monitored in accordance with the one or more bits in the DCI of the first PDCCH.

In the embodiments of the present disclosure, the method in FIG. 2 may further include receiving indication information from a network side device (e.g., a base station). The indication information may be used to indicate the UE to monitor the first PDCCH or indicate that the first PDCCH has been configured by the network side device for the UE, or the indication information may be used to indicate the UE not to monitor the first PDCCH or indicate that the first PDCCH has not been configured by the network side device for the UE.

In a possible embodiment of the present disclosure, the one or more bits in the DCI transmitted through the first PDCCH may be used to indicate the PDCCH not to be monitored in at least one of the following modes 1 to 5.

Mode 1: the one or more bits in the DCI transmitted through the first PDCCH may be used to indicate the UE not to monitor a second PDCCH having a same DCI format as the first PDCCH or having a specific DCI format within subsequent N slots. It should be appreciated that, the specific DCI format may be a certain DCI format or some DCI formats. N is an integer greater than or equal to 1, and it may be configured by the network side device or predefined.

It should be appreciated that, a slot within which the first PDCCH has been monitored may be called as a current slot, and slots after the current slot may be the subsequent slots.

Mode 2: the one or more bits in the DCI transmitted through the first PDCCH may be used to indicate the UE not to monitor a third PDCCH having a same radio network temporary identity (Radio Network Temporary Identity, RNTI) as the first PDCCH or having a specific RNTI within subsequent N slots. It should be appreciated that, the specific RNTI may be a certain RNTI or some RNTIs. N is an integer greater than or equal to 1, and it may be configured by the network side device or predefined.

Mode 3: the one or more bits in the DCI transmitted through the first PDCCH may be used to indicate the UE not to monitor a fourth PDCCH having a same search space (Search Space, SS) as the first PDCCH or having a specific SS within subsequent N slots. It should be appreciated that, the specific SS may be a certain SS or some SSs. N is an integer greater than or equal to 1, and it may be configured by the network side device or predefined.

Mode 4: the one or more bits in the DCI transmitted through the first PDCCH may be used to indicate the UE not to monitor a fifth PDCCH having a same SS type as the first PDCCH or having a specific SS type within subsequent N slots. It should be appreciated that, the specific SS type may be a certain SS type or some SS types. N is an integer greater than or equal to 1, and it may be configured by the network side device or predefined.

Mode 5: the one or more bits in the DCI transmitted through the first PDCCH may be used to indicate the UE not to monitor a sixth PDCCH having a same control-resource set (Control-Resource Set, CORESET) as the first PDCCH or having a specific CORESET within subsequent N slots. It should be appreciated that, the specific CORESET may be a certain CORESET or some CORESETs. N is an integer greater than or equal to 1, and it may be configured by the network side device or predefined.

In Mode 1, the one or more bits in the DCI transmitted through the first PDCCH may be used to indicate the UE not to monitor the second PDCCH having the same DCI format as the first PDCCH or having the specific DCI format within the subsequent N slots in at least one of the followings.

(a) The one or more bits in the DCI in a first DCI format or a second DCI format transmitted through the first PDCCH may be used to indicate the UE not to monitor the second PDCCH having the first DCI format or the second DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. In other words, the PDCCH having at least one of DCI format 0_0 and DCI format 1_0 may not be monitored.

(b) The one or more bits in the DCI in the first DCI format or a third DCI format transmitted through the first PDCCH may be used to indicate the UE not to monitor the third PDCCH having the first DCI format or the third DCI format within the subsequent N slots. The first DCI format may be used to schedule physical uplink shared channels for one cell, and it may be DCI format 0_0. The third DCI format may be used to schedule physical uplink shared channels for one cell, and it may be DCI format 0_1. In other words, the UE may be indicated, through the DCI for uplink scheduling, not to monitor subsequent N pieces of DCI for uplink scheduling.

(c) The one or more bits in the DCI in the second DCI format or a fourth DCI format transmitted through the first PDCCH may be used to indicate the UE not to monitor the second PDCCH having the second DCI format or the fourth DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1. In other words, the UE may be indicated, through the DCI for downlink scheduling, not to monitor subsequent N pieces of DCI for downlink scheduling.

(d) The one or more bits in the DCI in the second DCI format or the fourth DCI format transmitted through the first PDCCH may be used to indicate the UE not to monitor the second PDCCH having the first DCI format or the third DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1. In other words, the UE may be indicated, through the DCI for downlink scheduling, not to monitor subsequent N pieces of DCI for uplink scheduling.

(e) The one or more bits in the DCI in the first DCI format or the third DCI format transmitted through the first PDCCH may be used to indicate the UE not to monitor the second PDCCH having the second DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1. In other words, the UE may be indicated, through the DCI for uplink scheduling, not to monitor subsequent N pieces of DCI for downlink scheduling.

(f) The one or more bits in the DCI in the first DCI format, the second DCI format, the third DCI format or the fourth DCI format transmitted through the first PDCCH may be used to indicate the UE not to monitor the second PDCCH having the first DCI format, the second DCI format, the third DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1. In other words, the UE may be indicated, through any DCI for data scheduling, not to monitor subsequent N pieces of DCI for data scheduling.

(g) The one or more bits in a fifth DCI format transmitted through the first PDCCH may be used to indicate the UE not to monitor the second PDCCH having the fifth DCI format within subsequent N slots. The fifth DCI format may be used to notify a group of slot formats of the UE, and it may be DCI format 2_0. To be specific, slot format indication (Slot Format Indication, SFI) DCI may be used to indicate the UE not to monitor subsequent N pieces of SFI DCI. In other words, SFI in slots where the N pieces of SFI DCI are located may be indicated in accordance with a first piece of SFI DCI by default for the UE.

In a possible embodiment of the present disclosure, the subsequent N slots may refer to subsequent N slots which meet a monitoring periodicity and an offset value configured by the network side device, or subsequent N downlink slots which meet the monitoring periodicity and the offset value configured by the network side device.

In a possible embodiment of the present disclosure, the one or more bits in the DCI transmitted through the first PDCCH may be used to indicate the PDCCH to be monitored in at least one of the followings. The one or more bits in the DCI transmitted through the first PDCCH may be used to indicate the UE to monitor a seventh PDCCH having a same DCI format as the first PDCCH or having a specific DCI format within a first slot subsequent to the subsequent N slots. The one or more bits in the DCI transmitted through the first PDCCH may be used to indicate the UE to monitor an eighth PDCCH having a same RNTI as the first PDCCH or having a specific RNTI within the first slot subsequent to the subsequent N slots. The one or more bits in the DCI transmitted through the first PDCCH may be used to indicate the UE to monitor a ninth PDCCH having a same SS as the first PDCCH or having a specific SS within the first slot subsequent to the subsequent N slots. The one or more bits in the DCI transmitted through the first PDCCH may be used to indicate the UE to monitor a tenth PDCCH having a same SS type as the first PDCCH or having a specific SS type within the first slot subsequent to the subsequent N slots. The one or more bits in the DCI transmitted through the first PDCCH may be used to indicate the UE to monitor an eleventh PDCCH having a same CORESET as the first PDCCH or having a specific CORESET within the first slot subsequent to the subsequent N slots. N is an integer greater than or equal to 1.

In the embodiments of the present disclosure, the one or more bits in the DCI transmitted through the first PDCCH may be used to indicate the UE to monitor the seventh PDCCH having the same DCI format as the first PDCCH or having the specific DCI format within the first slot subsequent to the subsequent N slots in at least one of the followings. The one or more bits in the DCI in a first DCI format or a second DCI format transmitted through the first PDCCH may be used to indicate the UE to monitor the seventh PDCCH having the first DCI format or the second DCI format within the first slot subsequent to the subsequent N slots. The one or more bits in the DCI in the first DCI format or a third DCI format transmitted through the first PDCCH may be used to indicate the UE to monitor the seventh PDCCH having the first DCI format or the third DCI format within the first slot subsequent to the subsequent N slots. The one or more bits in the DCI in the second DCI format or a fourth DCI format transmitted through the first PDCCH may be used to indicate the UE to monitor the seventh PDCCH having the second DCI format or the fourth DCI format within the first slot subsequent to the subsequent N slots. The one or more bits in the DCI in the second DCI format or the fourth DCI format transmitted through the first PDCCH may be used to indicate the UE to monitor the seventh PDCCH having the first DCI format or the third DCI format within the first slot subsequent to the subsequent N slots. The one or more bits in the DCI in the first DCI format or the third DCI format transmitted through the first PDCCH may be used to indicate the UE to monitor the seventh PDCCH having the second DCI format or the fourth DCI format within the first slot subsequent to the subsequent N slots. The one or more bits in the DCI in the first DCI format, the second DCI format, the third DCI format or the fourth DCI format transmitted through the first PDCCH may be used to indicate the UE to monitor the seventh PDCCH having the first DCI format, the second DCI format, the third DCI format or the fourth DCI format within the first slot subsequent to the subsequent N slots. The one or more bits in the DCI in a fifth DCI format transmitted through the first PDCCH may be used to indicate the UE to monitor the seventh PDCCH having the fifth DCI format within the first slot subsequent to the subsequent N slots.

The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels for one cell, and it may be DCI format 1_1. The fifth DCI format may be used to notify a group of slot formats of the UE, and it may be DCI format 2_0.

In a possible embodiment of the present disclosure, the first slot subsequent to the subsequent N slots may be a first slot that meets the monitoring periodicity and the offset value configured by the network side device subsequent to the subsequent N slots that meets the monitoring periodicity and the offset value configured by the network side device, or a first downlink slot that meets the monitoring periodicity and the offset value configured by the network side device subsequent to the subsequent N slots that meets the monitoring periodicity and the offset value configured by the network side device.

In a possible embodiment of the present disclosure, a conventional DCI format may be reused by the DCI, i.e., it may be achieved through changing a function of bits in the conventional DCI, or the DCI may be in a new DCI format, i.e., it may be achieved through designing a new DCI format.

In a possible embodiment of the present disclosure, when the one or more bits in the DCI transmitted through the first PDCCH indicates the PDCCH to be monitored, the one or more bits in the DCI transmitted through the first PDCCH may be used to indicate a default monitoring behavior of the UE for monitoring the PDCCH. Further, the default monitoring behavior may at least include monitoring, by the UE, the PDCCH within a next slot or downlink slot that meets the monitoring periodicity and the offset value configured by the network side device.

In Mode 2, the one or more bits in the DCI transmitted through the first PDCCH may be used to indicate the UE not to monitor the third PDCCH having the same RNTI as the first PDCCH or having the specific RNTI within the subsequent N slots.

For example, the one or more bits in the DCI transmitted through the first PDCCH having a first RNTI may be used to indicate the UE not to monitor the third PDCCH having the first RNTI within the subsequent N slots.

For another example, the one or more bits in the DCI transmitted through the first PDCCH having the first RNTI may be used to indicate the UE not to monitor the third PDCCH having a second RNTI within the subsequent N slots.

In the embodiments of the present disclosure, the RNTI may include any one of a cell-radio network temporary identifier (Cell-Radio Network Temporary Identifier, C-RNTI), a temporary cell-radio network temporary identifier (Temporary Cell-Radio Network Temporary Identifier, TC-RNTI), a system information-radio network temporary identifier (System Information-Cell Radio Network Temporary Identifier, SI-RNTI), a paging radio network temporary identifier (Paging-Radio Network Temporary Identifier, P-RNTI), a semi-persistent scheduling-radio network temporary identifier (Semi-Persistent Scheduling-Radio Network Temporary Identifier, SPS-RNTI), a configuration scheduling-radio network temporary identifier (Configuration Scheduling-Radio Network Temporary Identifier, CS-RNTI), an interrupt transfer radio network temporary identifier (Interrupt Transfer Radio Network Temporary Identifier, INT-RNTI), a transmission power control-sounding reference signal-radio network temporary identifier (Transmission Power Control-Sounding Reference Signal-Radio Network Temporary Identifier, TPC-SRS-RNTI), a transmission power control-physical uplink shared channel-radio network temporary identifier (Transmission Power Control-Physical Uplink Shared Channel-Radio Network Temporary Identifier, TPC-PUSCH-RNTI), a transmission power control-physical uplink control channel-radio network temporary identifier (Transmission Power Control-Physical Uplink Control Channel-Radio Network Temporary Identifier, TPC-PUCCH-RNTI), a semi-persistent-channel state information-radio network temporary identifier (Semi-Persistent-Channel State Information-Radio Network Temporary Identifier, SP-CSI-RNTI), a random access-radio network temporary identifier (Random Access-Radio Network Temporary Identifier, RA-RNTI) and an SFI-RNTI.

The first RNTI and the second RNTI may belong to the above-mentioned types of RNTIs, and the first RNTI may be different from the second RNTI.

In Mode 3, the one or more bits in the DCI transmitted through the first PDCCH may be used to indicate the UE not to monitor the fourth PDCCH having the same SS as the first PDCCH or having the specific SS within the subsequent N slots.

For example, the DCI transmitted through the first PDCCH having a first SS may be used to indicate the UE not to monitor the fourth PDCCH having the first SS within the subsequent N slots.

For another example, the DCI transmitted through the first PDCCH having the first SS may be used to indicate the UE not to monitor the fourth PDCCH having a second SS within the subsequent N slots.

In Mode 4, the one or more bits in the DCI transmitted through the first PDCCH may be used to indicate the UE not to monitor the fifth PDCCH having the same SS type as the first PDCCH or having the specific SS type within the subsequent N slots in at least one of the followings.

(a) The one or more bits in the DCI transmitted through the first PDCCH having a first common SS type may be used to indicate the UE not to monitor the fifth PDCCH having the first common SS type within the subsequent N slots, and the first common SS type may be a common SS type 0 (Type 0 CSS) or a common SS type 0A (Type 0A CSS).

(b) The one or more bits in the DCI transmitted through the first PDCCH having a second common SS type may be used to indicate the UE not to monitor the fifth PDCCH having the second common SS type within the subsequent N slots, and the second common SS type may be a common SS type 1 (Type 1 CSS).

(c) The one or more bits in the DCI transmitted through the first PDCCH having a third common SS type may be used to indicate the UE not to monitor the fifth PDCCH having the third common SS type within the subsequent N slots, and the third common SS type may be a common SS type 2 (Type 2 CSS).

(d) The one or more bits in the DCI transmitted through the first PDCCH having a fourth common SS type may be used to indicate the UE not to monitor the fifth PDCCH having the fourth common SS type within the subsequent N slots, and the fourth common SS type may be a common SS type 3 (Type 3 CSS).

(e) The one or more bits in the DCI transmitted through the first PDCCH having a UE-specific SS (UE SS) may be used to indicate the UE not to monitor the fifth PDCCH having the UE SS type within the subsequent N slots.

(f) The one or more bits in the DCI transmitted through the first PDCCH having the first SS type may be used to indicate the UE not to monitor the fifth PDCCH having the second SS type within the subsequent N slots.

According to the embodiments of the present disclosure, the one or more bits in the DCI transmitted through the first PDCCH monitored by the UE may be acquired, and the one or more bits in the DCI transmitted through the first PDCCH may be used to indicate the PDCCH not to be monitored and/or the PDCCH to be monitored. As a result, it is able for the UE to determine the PDCCH not be monitored and/or the PDCCH to be monitored in accordance with the one or more bits in the DCI transmitted through the first PDCCH, so as to prevent the UE from monitoring the unnecessary PDCCH, thereby to reduce the power consumption for the UE.

Figure 3:
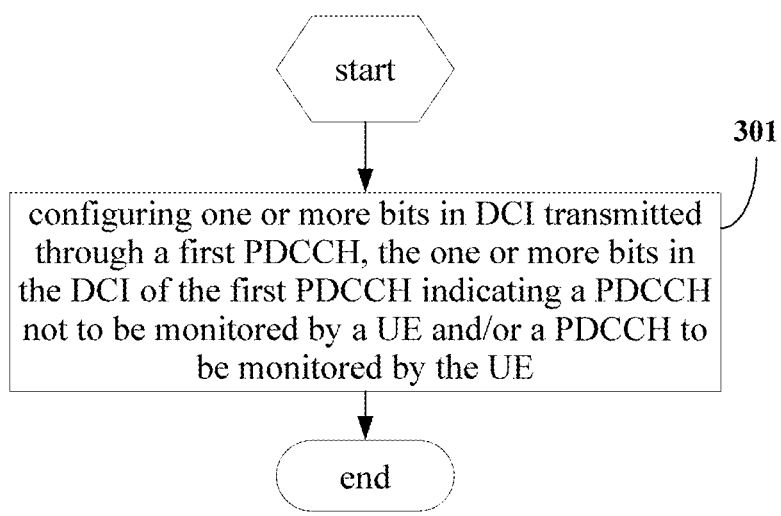
FIG. 3 is a flow chart of a PDCCH configuration method according to one embodiment of the present disclosure.

As shown in FIG. 3, the present disclosure further provides in some embodiments a PDCCH configuration method for a network side device, which includes Step 301 of configuring one or more bits in DCI transmitted through a first PDCCH, the one or more bits in the DCI of the first PDCCH indicating a PDCCH not to be monitored by a UE and/or a PDCCH to be monitored by the UE.

In the embodiments of the present disclosure, the method in FIG. 3 may further include transmitting indication information to the UE. The indication information may be used to indicate the UE to monitor the first PDCCH or indicate that the first PDCCH has been configured by the network side device for the UE, or the indication information may be used to indicate the UE not to monitor the first PDCCH or indicate that the first PDCCH has not been configured by the network side device for the UE.

In a possible embodiment of the present disclosure, the one or more bits in the DCI transmitted through the first PDCCH may be used to indicate the PDCCH not to be monitored in at least one of the following modes 1 to 5.

Mode 1: the one or more bits in the DCI transmitted through the first PDCCH may be used to indicate the UE not to monitor a second PDCCH having a same DCI format as the first PDCCH or having a specific DCI format within subsequent N slots. It should be appreciated that, the specific DCI format may be a certain DCI format or some DCI formats. N is an integer greater than or equal to 1.

Mode 2: the one or more bits in the DCI transmitted through the first PDCCH may be used to indicate the UE not to monitor a third PDCCH having a same RNTI as the first PDCCH or having a specific RNTI within subsequent N slots. It should be appreciated that, the specific RNTI may be a certain RNTI or some RNTIs. N is an integer greater than or equal to 1.

Mode 3: the one or more bits in the DCI transmitted through the first PDCCH may be used to indicate the UE not to monitor a fourth PDCCH having a same SS as the first PDCCH or having a specific SS within subsequent N slots. It should be appreciated that, the specific SS may be a certain SS or some SSs. N is an integer greater than or equal to 1.

Mode 4: the one or more bits in the DCI transmitted through the first PDCCH may be used to indicate the UE not to monitor a fifth PDCCH having a same SS type as the first PDCCH or having a specific SS type within subsequent N slots. It should be appreciated that, the specific SS type may be a certain SS type or some SS types. N is an integer greater than or equal to 1.

Mode 5: the one or more bits in the DCI transmitted through the first PDCCH may be used to indicate the UE not to monitor a sixth PDCCH having a same CORESET as the first PDCCH or having a specific CORESET within subsequent N slots. It should be appreciated that, the specific CORESET may be a certain CORESET or some CORESETs. N is an integer greater than or equal to 1.

In Mode 1, the one or more bits in the DCI transmitted through the first PDCCH may be used to indicate the UE not to monitor the second PDCCH having the same DCI format as the first PDCCH or having the specific DCI format within the subsequent N slots in at least one of the followings.

(a) The one or more bits in the DCI in a first DCI format or a second DCI format transmitted through the first PDCCH may be used to indicate the UE not to monitor the second PDCCH having the first DCI format or the second DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. In other words, the PDCCH having at least one of DCI format 0_0 and DCI format 1_0 may not be monitored.

(b) The one or more bits in the DCI in the first DCI format or a third DCI format transmitted through the first PDCCH may be used to indicate the UE not to monitor the third PDCCH having the first DCI format or the third DCI format within the subsequent N slots. The first DCI format may be used to schedule physical uplink shared channels for one cell, and it may be DCI format 0_0. The third DCI format may be used to schedule physical uplink shared channels for one cell, and it may be DCI format 0_1. In other words, the UE may be indicated, through the DCI for uplink scheduling, not to monitor subsequent N pieces of DCI for uplink scheduling.

(c) The one or more bits in the DCI in the second DCI format or a fourth DCI format transmitted through the first PDCCH may be used to indicate the UE not to monitor the second PDCCH having the second DCI format or the fourth DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1. In other words, the UE may be indicated, through the DCI for downlink scheduling, not to monitor subsequent N pieces of DCI for downlink scheduling.

(d) The one or more bits in the DCI in the second DCI format or the fourth DCI format transmitted through the first PDCCH may be used to indicate the UE not to monitor the second PDCCH having the first DCI format or the third DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1. In other words, the UE may be indicated, through the DCI for downlink scheduling, not to monitor subsequent N pieces of DCI for uplink scheduling.

(e) The one or more bits in the DCI in the first DCI format or the third DCI format transmitted through the first PDCCH may be used to indicate the UE not to monitor the second PDCCH having the second DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1. In other words, the UE may be indicated, through the DCI for uplink scheduling, not to monitor subsequent N pieces of DCI for downlink scheduling.

(f) The one or more bits in the DCI in the first DCI format, the second DCI format, the third DCI format or the fourth DCI format transmitted through the first PDCCH may be used to indicate the UE not to monitor the second PDCCH having the first DCI format, the second DCI format, the third DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1. In other words, the UE may be indicated, through any DCI for data scheduling, not to monitor subsequent N pieces of DCI for data scheduling.

(g) The one or more bits in the DCI in a fifth DCI format transmitted through the first PDCCH may be used to indicate the UE not to monitor the second PDCCH having the fifth DCI format within subsequent N slots. The fifth DCI format may be used to notify a group of slot formats of the UE, and it may be DCI format 2_0. To be specific, SFI DCI may be used to indicate the UE not to monitor subsequent N pieces of SFI DCI. In other words, SFI in slots where the N pieces of SFI DCI are located may be indicated in accordance with a first piece of SFI DCI for the UE.

In a possible embodiment of the present disclosure, the subsequent N slots may refer to subsequent N slots which meet a monitoring periodicity and an offset value configured by the network side device, or subsequent N downlink slots which meet the monitoring periodicity and the offset value configured by the network side device.

In a possible embodiment of the present disclosure, the one or more bits in the DCI transmitted through the first PDCCH may be used to indicate the PDCCH to be monitored in at least one of the followings. The one or more bits in the DCI transmitted through the first PDCCH may be used to indicate the UE to monitor a seventh PDCCH having a same DCI format as the first PDCCH or having a specific DCI format within a first slot subsequent to the subsequent N slots. The one or more bits in the DCI transmitted through the first PDCCH may be used to indicate the UE to monitor an eighth PDCCH having a same RNTI as the first PDCCH or having a specific RNTI within the first slot subsequent to the subsequent N slots. The one or more bits in the DCI transmitted through the first PDCCH may be used to indicate the UE to monitor a ninth PDCCH having a same SS as the first PDCCH or having a specific SS within the first slot subsequent to the subsequent N slots. The one or more bits in the DCI transmitted through the first PDCCH may be used to indicate the UE to monitor a tenth PDCCH having a same SS type as the first PDCCH or having a specific SS type within the first slot subsequent to the subsequent N slots. The one or more bits in the DCI transmitted through the first PDCCH may be used to indicate the UE to monitor an eleventh PDCCH having a same CORESET as the first PDCCH or having a specific CORESET within the first slot subsequent to the subsequent N slots. N is an integer greater than or equal to 1.

In the embodiments of the present disclosure, the one or more bits in the DCI transmitted through the first PDCCH may be used to indicate the UE to monitor the seventh PDCCH having the same DCI format as the first PDCCH or having the specific DCI format within the first slot subsequent to the subsequent N slots in at least one of the followings. The one or more bits in the DCI in a first DCI format or a second DCI format transmitted through the first PDCCH may be used to indicate the UE to monitor the seventh PDCCH having the first DCI format or the second DCI format within the first slot subsequent to the subsequent N slots. The one or more bits in the DCI in the first DCI format or a third DCI format transmitted through the first PDCCH may be used to indicate the UE to monitor the seventh PDCCH having the first DCI format or the third DCI format within the first slot subsequent to the subsequent N slots. The one or more bits in the DCI in the second DCI format or a fourth DCI format transmitted through the first PDCCH may be used to indicate the UE to monitor the seventh PDCCH having the second DCI format or the fourth DCI format within the first slot subsequent to the subsequent N slots. The one or more bits in the DCI in the second DCI format or the fourth DCI format transmitted through the first PDCCH may be used to indicate the UE to monitor the seventh PDCCH having the first DCI format or the third DCI format within the first slot subsequent to the subsequent N slots. The one or more bits in the DCI in the first DCI format or the third DCI format transmitted through the first PDCCH may be used to indicate the UE to monitor the seventh PDCCH having the second DCI format or the fourth DCI format within the first slot subsequent to the subsequent N slots. The one or more bits in the DCI in the first DCI format, the second DCI format, the third DCI format or the fourth DCI format transmitted through the first PDCCH may be used to indicate the UE to monitor the seventh PDCCH having the first DCI format, the second DCI format, the third DCI format or the fourth DCI format within the first slot subsequent to the subsequent N slots. The one or more bits in the DCI in a fifth DCI format transmitted through the first PDCCH may be used to indicate the UE to monitor the seventh PDCCH having the fifth DCI format within the first slot subsequent to the subsequent N slots.

The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels for one cell, and it may be DCI format 1_1. The fifth DCI format may be used to notify a group of slot formats of the UE, and it may be DCI format 2_0.

In a possible embodiment of the present disclosure, the first slot subsequent to the subsequent N slots may be a first slot that meets the monitoring periodicity and the offset value configured by the network side device subsequent to the subsequent N slots that meets the monitoring periodicity and the offset value configured by the network side device, or a first downlink slot that meets the monitoring periodicity and the offset value configured by the network side device subsequent to the subsequent N slots that meets the monitoring periodicity and the offset value configured by the network side device.

In a possible embodiment of the present disclosure, a conventional DCI format may be reused by the DCI, i.e., it may be achieved through changing a function of bits in the conventional DCI, or the DCI may be in a new DCI format, i.e., it may be achieved through designing a new DCI format.

In a possible embodiment of the present disclosure, when the one or more bits in the DCI transmitted through the first PDCCH indicates the PDCCH to be monitored, the one or more bits in the DCI transmitted through the first PDCCH may be used to indicate a default monitoring behavior of the UE for monitoring the PDCCH. Further, the default monitoring behavior may at least include monitoring, by the UE, the PDCCH within a next slot or downlink slot that meets the monitoring periodicity and the offset value configured by the network side device.

In Mode 2, the one or more bits in the DCI transmitted through the first PDCCH may be used to indicate the UE not to monitor the third PDCCH having the same RNTI as the first PDCCH or having the specific RNTI within the subsequent N slots.

For example, the one or more bits in the DCI transmitted through the first PDCCH having a first RNTI may be used to indicate the UE not to monitor the third PDCCH having the first RNTI within the subsequent N slots.

For another example, the one or more bits in the DCI transmitted through the first PDCCH having the first RNTI may be used to indicate the UE not to monitor the third PDCCH having a second RNTI within the subsequent N slots.

In the embodiments of the present disclosure, the RNTI may include any one of a C-RNTI, a TC-RNTI, an SI-RNTI, a P-RNTI, an SPS-RNTI, a CS-RNTI, an INT-RNTI, a TPC-SRS-RNTI, a TPC-PUSCH-RNTI, a TPC-PUCCH-RNTI, an SP-CSI-RNTI, an RA-RNTI and an SFI-RNTI.

The first RNTI and the second RNTI may belong to the above-mentioned types of RNTIs, and the first RNTI may be different from the second RNTI.

In Mode 3, the one or more bits in the DCI transmitted through the first PDCCH may be used to indicate the UE not to monitor the fourth PDCCH having the same SS as the first PDCCH or having the specific SS within the subsequent N slots.

For example, the DCI transmitted through the first PDCCH having a first SS may be used to indicate the UE not to monitor the fourth PDCCH having the first SS within the subsequent N slots.

For another example, the DCI transmitted through the first PDCCH having the first SS may be used to indicate the UE not to monitor the fourth PDCCH having a second SS within the subsequent N slots.

In Mode 4, the one or more bits in the DCI transmitted through the first PDCCH may be used to indicate the UE not to monitor the fifth PDCCH having the same SS type as the first PDCCH or having the specific SS type within the subsequent N slots in at least one of the followings.

(a) The one or more bits in the DCI transmitted through the first PDCCH having a first common SS type may be used to indicate the UE not to monitor the fifth PDCCH having the first common SS type within the subsequent N slots, and the first common SS type may be a common SS type 0 (Type 0 CSS) or a common SS type 0A (Type 0A CSS).

(b) The one or more bits in the DCI transmitted through the first PDCCH having a second common SS type may be used to indicate the UE not to monitor the fifth PDCCH having the second common SS type within the subsequent N slots, and the second common SS type may be a common SS type 1 (Type 1 CSS).

(c) The one or more bits in the DCI transmitted through the first PDCCH having a third common SS type may be used to indicate the UE not to monitor the fifth PDCCH having the third common SS type within the subsequent N slots, and the third common SS type may be a common SS type 2 (Type 2 CSS).

(d) The one or more bits in the DCI transmitted through the first PDCCH having a fourth common SS type may be used to indicate the UE not to monitor the fifth PDCCH having the fourth common SS type within the subsequent N slots, and the fourth common SS type may be a common SS type 3 (Type 3 CSS).

(e) The one or more bits in the DCI transmitted through the first PDCCH having a UE-specific SS (UE SS) may be used to indicate the UE not to monitor the fifth PDCCH having the UE SS type within the subsequent N slots.

(f) The one or more bits in the DCI transmitted through the first PDCCH having the first SS type may be used to indicate the UE not to monitor the fifth PDCCH having the second SS type within the subsequent N slots.

According to the embodiments of the present disclosure, the one or more bits in the DCI transmitted through the first PDCCH monitored by the UE may be acquired, and the one or more bits in the DCI transmitted through the first PDCCH may be used to indicate the PDCCH not to be monitored and/or the PDCCH to be monitored. As a result, it is able for the UE to determine the PDCCH not be monitored and/or the PDCCH to be monitored in accordance with the one or more bits in the DCI transmitted through the first PDCCH, so as to prevent the UE from monitoring the unnecessary PDCCH, thereby to reduce the power consumption for the UE.

The present disclosure further provides in some embodiments a UE. A principle of the UE for solving the problem is similar to that of the PDCCH monitoring method mentioned hereinabove, so the implementation of the UE may refer to that of the method, which will not be particularly defined herein.

Figure 4:
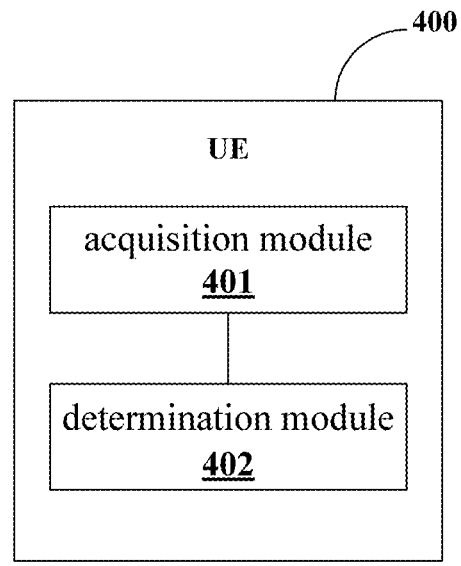
FIG. 4 is a schematic view showing a UE according to one embodiment of the present disclosure.

As shown in FIG. 4 which shows a structure of the UE according to one embodiment of the present disclosure, the UE 400 includes: an acquisition module 401 configured to acquire one or more bits in DCI transmitted through a first PDCCH monitored by the UE, the one or more bits in the DCI of the first PDCCH indicating a PDCCH not to be monitored and/or a PDCCH to be monitored; and a determination module 402 configured to determine the PDCCH not to be monitored and/or the PDCCH to be monitored in accordance with the one or more bits in the DCI of the first PDCCH.

In a possible embodiment of the present disclosure, the UE may further include a reception module configured to receive indication information from a network side device. The indication information may be used to indicate the UE to monitor the first PDCCH or indicate that the first PDCCH has been configured by the network side device for the UE, or the indication information may be used to indicate the UE not to monitor the first PDCCH or indicate that the first PDCCH has not been configured by the network side device for the UE.

In a possible embodiment of the present disclosure, the one or more bits in the DCI transmitted through the first PDCCH may be used to indicate the PDCCH not to be monitored in at least one of the following modes 1 to 5.

Mode 1: the one or more bits in the DCI transmitted through the first PDCCH may be used to indicate the UE not to monitor a second PDCCH having a same DCI format as the first PDCCH or having a specific DCI format within subsequent N slots. It should be appreciated that, the specific DCI format may be a certain DCI format or some DCI formats. N is an integer greater than or equal to 1.

Mode 2: the one or more bits in the DCI transmitted through the first PDCCH may be used to indicate the UE not to monitor a third PDCCH having a same RNTI as the first PDCCH or having a specific RNTI within subsequent N slots. It should be appreciated that, the specific RNTI may be a certain RNTI or some RNTIs. N is an integer greater than or equal to 1.

Mode 3: the one or more bits in the DCI transmitted through the first PDCCH may be used to indicate the UE not to monitor a fourth PDCCH having a same SS as the first PDCCH or having a specific SS within subsequent N slots. It should be appreciated that, the specific SS may be a certain SS or some SSs. N is an integer greater than or equal to 1.

Mode 4: the one or more bits in the DCI transmitted through the first PDCCH may be used to indicate the UE not to monitor a fifth PDCCH having a same SS type as the first PDCCH or having a specific SS type within subsequent N slots. It should be appreciated that, the specific SS type may be a certain SS type or some SS types. N is an integer greater than or equal to 1.

Mode 5: the one or more bits in the DCI transmitted through the first PDCCH may be used to indicate the UE not to monitor a sixth PDCCH having a same CORESET as the first PDCCH or having a specific CORESET within subsequent N slots. It should be appreciated that, the specific CORESET may be a certain CORESET or some CORESETs. N is an integer greater than or equal to 1.

In Mode 1, the one or more bits in the DCI transmitted through the first PDCCH may be used to indicate the UE not to monitor the second PDCCH having the same DCI format as the first PDCCH or having the specific DCI format within the subsequent N slots in at least one of the followings.

(a) The one or more bits in the DCI in a first DCI format or a second DCI format transmitted through the first PDCCH may be used to indicate the UE not to monitor the second PDCCH having the first DCI format or the second DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0.

(b) The one or more bits in the DCI in the first DCI format or a third DCI format transmitted through the first PDCCH may be used to indicate the UE not to monitor the third PDCCH having the first DCI format or the third DCI format within the subsequent N slots. The first DCI format may be used to schedule physical uplink shared channels for one cell, and it may be DCI format 0_0. The third DCI format may be used to schedule physical uplink shared channels for one cell, and it may be DCI format 0_1.

(c) The one or more bits in the DCI in the second DCI format or a fourth DCI format transmitted through the first PDCCH may be used to indicate the UE not to monitor the second PDCCH having the second DCI format or the fourth DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1.

(d) The one or more bits in the DCI in the second DCI format or the fourth DCI format transmitted through the first PDCCH may be used to indicate the UE not to monitor the second PDCCH having the first DCI format or the third DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1.

(e) The one or more bits in the DCI in the first DCI format or the third DCI format transmitted through the first PDCCH may be used to indicate the UE not to monitor the second PDCCH having the second DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1.

(f) The one or more bits in the DCI in the first DCI format, the second DCI format, the third DCI format or the fourth DCI format transmitted through the first PDCCH may be used to indicate the UE not to monitor the second PDCCH having the first DCI format, the second DCI format, the third DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1.

(g) The one or more bits in the DCI in a fifth DCI format transmitted through the first PDCCH may be used to indicate the UE not to monitor the second PDCCH having the fifth DCI format within subsequent N slots. The fifth DCI format may be used to notify a group of slot formats of the UE, and it may be DCI format 2_0. To be specific, SFI DCI may be used to indicate the UE not to monitor subsequent N pieces of SFI DCI. In other words, SFI in slots where the N pieces of SFI DCI are located may be indicated in accordance with a first piece of SFI DCI by default for the UE.

In a possible embodiment of the present disclosure, the subsequent N slots may refer to subsequent N slots which meet a monitoring periodicity and an offset value configured by the network side device, or subsequent N downlink slots which meet the monitoring periodicity and the offset value configured by the network side device.

In a possible embodiment of the present disclosure, the one or more bits in the DCI transmitted through the first PDCCH may be used to indicate the PDCCH to be monitored in at least one of the followings. The one or more bits in the DCI transmitted through the first PDCCH may be used to indicate the UE to monitor a seventh PDCCH having a same DCI format as the first PDCCH or having a specific DCI format within a first slot subsequent to the subsequent N slots. The one or more bits in the DCI transmitted through the first PDCCH may be used to indicate the UE to monitor an eighth PDCCH having a same RNTI as the first PDCCH or having a specific RNTI within the first slot subsequent to the subsequent N slots. The one or more bits in the DCI transmitted through the first PDCCH may be used to indicate the UE to monitor a ninth PDCCH having a same SS as the first PDCCH or having a specific SS within the first slot subsequent to the subsequent N slots. The one or more bits in the DCI transmitted through the first PDCCH may be used to indicate the UE to monitor a tenth PDCCH having a same SS type as the first PDCCH or having a specific SS type within the first slot subsequent to the subsequent N slots. The one or more bits in the DCI transmitted through the first PDCCH may be used to indicate the UE to monitor an eleventh PDCCH having a same CORESET as the first PDCCH or having a specific CORESET within the first slot subsequent to the subsequent N slots. N is an integer greater than or equal to 1.

In the embodiments of the present disclosure, the one or more bits in the DCI transmitted through the first PDCCH may be used to indicate the UE to monitor the seventh PDCCH having the same DCI format as the first PDCCH or having the specific DCI format within the first slot subsequent to the subsequent N slots in at least one of the followings. The one or more bits in the DCI in a first DCI format or a second DCI format transmitted through the first PDCCH may be used to indicate the UE to monitor the seventh PDCCH having the first DCI format or the second DCI format within the first slot subsequent to the subsequent N slots. The one or more bits in the DCI in the first DCI format or a third DCI format transmitted through the first PDCCH may be used to indicate the UE to monitor the seventh PDCCH having the first DCI format or the third DCI format within the first slot subsequent to the subsequent N slots. The one or more bits in the DCI in the second DCI format or a fourth DCI format transmitted through the first PDCCH may be used to indicate the UE to monitor the seventh PDCCH having the second DCI format or the fourth DCI format within the first slot subsequent to the subsequent N slots. The one or more bits in the DCI in the second DCI format or the fourth DCI format transmitted through the first PDCCH may be used to indicate the UE to monitor the seventh PDCCH having the first DCI format or the third DCI format within the first slot subsequent to the subsequent N slots. The one or more bits in the DCI in the first DCI format or the third DCI format transmitted through the first PDCCH may be used to indicate the UE to monitor the seventh PDCCH having the second DCI format or the fourth DCI format within the first slot subsequent to the subsequent N slots. The one or more bits in the DCI in the first DCI format, the second DCI format, the third DCI format or the fourth DCI format transmitted through the first PDCCH may be used to indicate the UE to monitor the seventh PDCCH having the first DCI format, the second DCI format, the third DCI format or the fourth DCI format within the first slot subsequent to the subsequent N slots. The one or more bits in the DCI in a fifth DCI format transmitted through the first PDCCH may be used to indicate the UE to monitor the seventh PDCCH having the fifth DCI format within the first slot subsequent to the subsequent N slots.

The first DCI format may be used to schedule physical uplink shared channels for one cell. The second DCI format may be used to schedule physical downlink shared channels for one cell. The third DCI format may be used to schedule physical uplink shared channels for one cell. The fourth DCI format may be used to schedule physical downlink shared channels for one cell. The fifth DCI format may be used to notify a group of slot formats of the UE.

In a possible embodiment of the present disclosure, the first slot subsequent to the subsequent N slots may be a first slot that meets the monitoring periodicity and the offset value configured by the network side device subsequent to the subsequent N slots that meets the monitoring periodicity and the offset value configured by the network side device, or a first downlink slot that meets the monitoring periodicity and the offset value configured by the network side device subsequent to the subsequent N slots that meets the monitoring periodicity and the offset value configured by the network side device.

In a possible embodiment of the present disclosure, a conventional DCI format may be reused by the DCI, i.e., it may be achieved through changing a function of bits in the conventional DCI, or the DCI may be in a new DCI format, i.e., it may be achieved through designing a new DCI format.

In a possible embodiment of the present disclosure, when the one or more bits in the DCI transmitted through the first PDCCH indicates the PDCCH to be monitored, the one or more bits in the DCI transmitted through the first PDCCH may be used to indicate a default monitoring behavior of the UE for monitoring the PDCCH. Further, the default monitoring behavior may at least include monitoring, by the UE, the PDCCH within a next slot or downlink slot that meets the monitoring periodicity and the offset value configured by the network side device.

In Mode 2, the one or more bits in the DCI transmitted through the first PDCCH may be used to indicate the UE not to monitor the third PDCCH having the same RNTI as the first PDCCH or having the specific RNTI within the subsequent N slots.

For example, the one or more bits in the DCI transmitted through the first PDCCH having a first RNTI may be used to indicate the UE not to monitor the third PDCCH having the first RNTI within the subsequent N slots.

For another example, the one or more bits in the DCI transmitted through the first PDCCH having the first RNTI may be used to indicate the UE not to monitor the third PDCCH having a second RNTI within the subsequent N slots.

In the embodiments of the present disclosure, the RNTI may include any one of a C-RNTI, a TC-RNTI, an SI-RNTI, a P-RNTI, an SPS-RNTI, a CS-RNTI, an INT-RNTI, a TPC-SRS-RNTI, a TPC-PUSCH-RNTI, a TPC-PUCCH-RNTI, an SP-CSI-RNTI, an RA-RNTI, and an SFI-RNTI.

The first RNTI and the second RNTI may belong to the above-mentioned types of RNTIs, and the first RNTI may be different from the second RNTI.

In Mode 3, the one or more bits in the DCI transmitted through the first PDCCH may be used to indicate the UE not to monitor the fourth PDCCH having the same SS as the first PDCCH or having the specific SS within the subsequent N slots.

For example, the DCI transmitted through the first PDCCH having a first SS may be used to indicate the UE not to monitor the fourth PDCCH having the first SS within the subsequent N slots.

For another example, the DCI transmitted through the first PDCCH having the first SS may be used to indicate the UE not to monitor the fourth PDCCH having a second SS within the subsequent N slots.

In Mode 4, the one or more bits in the DCI transmitted through the first PDCCH may be used to indicate the UE not to monitor the fifth PDCCH having the same SS type as the first PDCCH or having the specific SS type within the subsequent N slots in at least one of the followings.

(a) The one or more bits in the DCI transmitted through the first PDCCH having a first common SS type may be used to indicate the UE not to monitor the fifth PDCCH having the first common SS type within the subsequent N slots, and the first common SS type may be a common SS type 0 or a common SS type 0A.

(b) The one or more bits in the DCI transmitted through the first PDCCH having a second common SS type may be used to indicate the UE not to monitor the fifth PDCCH having the second common SS type within the subsequent N slots, and the second common SS type may be a common SS type 1.

(c) The one or more bits in the DCI transmitted through the first PDCCH having a third common SS type may be used to indicate the UE not to monitor the fifth PDCCH having the third common SS type within the subsequent N slots, and the third common SS type may be a common SS type 2.

(d) The one or more bits in the DCI transmitted through the first PDCCH having a fourth common SS type may be used to indicate the UE not to monitor the fifth PDCCH having the fourth common SS type within the subsequent N slots, and the fourth common SS type may be a common SS type 3.

(e) The one or more bits in the DCI transmitted through the first PDCCH having a UE SS may be used to indicate the UE not to monitor the fifth PDCCH having the UE SS type within the subsequent N slots.

(f) The one or more bits in the DCI transmitted through the first PDCCH having the first SS type may be used to indicate the UE not to monitor the fifth PDCCH having the second SS type within the subsequent N slots.

The UE in the embodiments of the present disclosure may be used to implement the above-mentioned method with a similar principle and technical effect, which will not be particularly defined herein.

The present disclosure further provides in some embodiments a network side device. A principle of the network side device for solving the problem is similar to that of the PDCCH configuration method mentioned hereinabove, so the implementation of the network side device may refer to that of the method, which will not be particularly defined herein.

Figure 5:
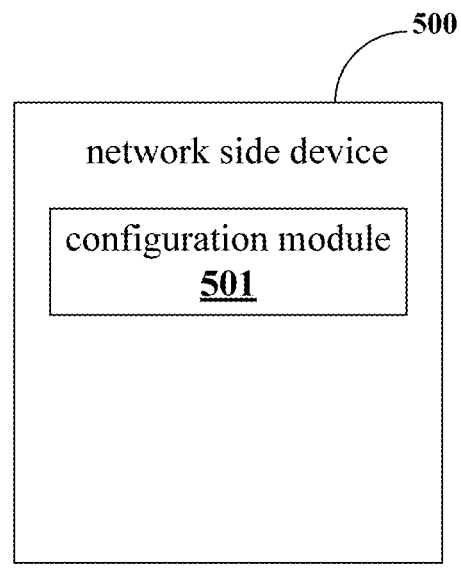
FIG. 5 is a schematic view showing a network side device according to one embodiment of the present disclosure.

As shown in FIG. 5 which shows a structure of the network side device according to one embodiment of the present disclosure, the network side device 500 includes a configuration module 501 configured to configure one or more bits in DCI transmitted through a first PDCCH, the one or more bits in the DCI of the first PDCCH indicating a PDCCH not to be monitored by a UE and/or a PDCCH to be monitored by the UE.

In a possible embodiment of the present disclosure, the network side device may further include a transmission module configured to transmit indication information to the UE. The indication information may be used to indicate the UE to monitor the first PDCCH or indicate that the first PDCCH has been configured by the network side device for the UE, or the indication information may be used to indicate the UE not to monitor the first PDCCH or indicate that the first PDCCH has not been configured by the network side device for the UE.

In a possible embodiment of the present disclosure, the one or more bits in the DCI transmitted through the first PDCCH may be used to indicate the PDCCH not to be monitored in at least one of the following modes 1 to 5.

Mode 1: the one or more bits in the DCI transmitted through the first PDCCH may be used to indicate the UE not to monitor a second PDCCH having a same DCI format as the first PDCCH or having a specific DCI format within subsequent N slots. It should be appreciated that, the specific DCI format may be a certain DCI format or some DCI formats. N is an integer greater than or equal to 1.

Mode 2: the one or more bits in the DCI transmitted through the first PDCCH may be used to indicate the UE not to monitor a third PDCCH having a same RNTI as the first PDCCH or having a specific RNTI within subsequent N slots. It should be appreciated that, the specific RNTI may be a certain RNTI or some RNTIs. N is an integer greater than or equal to 1.

Mode 3: the one or more bits in the DCI transmitted through the first PDCCH may be used to indicate the UE not to monitor a fourth PDCCH having a same SS as the first PDCCH or having a specific SS within subsequent N slots. It should be appreciated that, the specific SS may be a certain SS or some SSs. N is an integer greater than or equal to 1.

Mode 4: the one or more bits in the DCI transmitted through the first PDCCH may be used to indicate the UE not to monitor a fifth PDCCH having a same SS type as the first PDCCH or having a specific SS type within subsequent N slots. It should be appreciated that, the specific SS type may be a certain SS type or some SS types. N is an integer greater than or equal to 1.

Mode 5: the one or more bits in the DCI transmitted through the first PDCCH may be used to indicate the UE not to monitor a sixth PDCCH having a same CORESET as the first PDCCH or having a specific CORESET within subsequent N slots. It should be appreciated that, the specific CORESET may be a certain CORESET or some CORESETs. N is an integer greater than or equal to 1.

In Mode 1, the one or more bits in the DCI transmitted through the first PDCCH may be used to indicate the UE not to monitor the second PDCCH having the same DCI format as the first PDCCH or having the specific DCI format within the subsequent N slots in at least one of the followings.

(a) The one or more bits in the DCI in a first DCI format or a second DCI format transmitted through the first PDCCH may be used to indicate the UE not to monitor the second PDCCH having the first DCI format or the second DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0.

(b) The one or more bits in the DCI in the first DCI format or a third DCI format transmitted through the first PDCCH may be used to indicate the UE not to monitor the third PDCCH having the first DCI format or the third DCI format within the subsequent N slots. The first DCI format may be used to schedule physical uplink shared channels for one cell, and it may be DCI format 0_0. The third DCI format may be used to schedule physical uplink shared channels for one cell, and it may be DCI format 0_1.

(c) The one or more bits in the DCI in the second DCI format or a fourth DCI format transmitted through the first PDCCH may be used to indicate the UE not to monitor the second PDCCH having the second DCI format or the fourth DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1.

(d) The one or more bits in the DCI in the second DCI format or the fourth DCI format transmitted through the first PDCCH may be used to indicate the UE not to monitor the second PDCCH having the first DCI format or the third DCI format within the subsequent N slots. The second DCI format may be used to schedule physical downlink shared channels for one cell, and it may be DCI format 1_0. The fourth DCI format may be used to schedule physical downlink shared channels for one cell, and it may be DCI format 1_1.

(e) The one or more bits in the DCI in the first DCI format or the third DCI format transmitted through the first PDCCH may be used to indicate the UE not to monitor the second PDCCH having the second DCI format or the fourth DCI format within the subsequent N slots. The first DCI format may be used to schedule physical uplink shared channels for one cell, and it may be DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1.

(f) The one or more bits in the DCI in the first DCI format, the second DCI format, the third DCI format or the fourth DCI format transmitted through the first PDCCH may be used to indicate the UE not to monitor the second PDCCH having the first DCI format, the second DCI format, the third DCI format or the fourth DCI format within the subsequent N slots. The first DCI format may be used to schedule physical uplink shared channels for one cell, and it may be DCI DCI format 0_0. The second DCI format may be used to schedule physical downlink shared channels for one cell, and it may be DCI format 1_0. The third DCI format may be used to schedule physical uplink shared channels for one cell, and it may be DCI format 0_1. The fourth DCI format may be used to schedule physical downlink shared channels, and it may be DCI format 1_1.

(g) The one or more bits in the DCI in a fifth DCI format transmitted through the first PDCCH may be used to indicate the UE not to monitor the second PDCCH having the fifth DCI format within subsequent N slots. The fifth DCI format may be used to notify a group of slot formats of the UE, and it may be DCI format 2_0. To be specific, SFI DCI may be used to indicate the UE not to monitor subsequent N pieces of SFI DCI. In other words, SFI in slots where the N pieces of SFI DCI are located may be indicated in accordance with a first piece of SFI DCI for the UE.

In a possible embodiment of the present disclosure, the subsequent N slots may refer to subsequent N slots which meet a monitoring periodicity and an offset value configured by the network side device, or subsequent N downlink slots which meet the monitoring periodicity and the offset value configured by the network side device.

In a possible embodiment of the present disclosure, the one or more bits in the DCI transmitted through the first PDCCH may be used to indicate the PDCCH to be monitored in at least one of the followings. The one or more bits in the DCI transmitted through the first PDCCH may be used to indicate the UE to monitor a seventh PDCCH having a same DCI format as the first PDCCH or having a specific DCI format within a first slot subsequent to the subsequent N slots. The one or more bits in the DCI transmitted through the first PDCCH may be used to indicate the UE to monitor an eighth PDCCH having a same RNTI as the first PDCCH or having a specific RNTI within the first slot subsequent to the subsequent N slots. The one or more bits in the DCI transmitted through the first PDCCH may be used to indicate the UE to monitor a ninth PDCCH having a same SS as the first PDCCH or having a specific SS within the first slot subsequent to the subsequent N slots. The one or more bits in the DCI transmitted through the first PDCCH may be used to indicate the UE to monitor a tenth PDCCH having a same SS type as the first PDCCH or having a specific SS type within the first slot subsequent to the subsequent N slots. The one or more bits in the DCI transmitted through the first PDCCH may be used to indicate the UE to monitor an eleventh PDCCH having a same CORESET as the first PDCCH or having a specific CORESET within the first slot subsequent to the subsequent N slots. N is an integer greater than or equal to 1.

In the embodiments of the present disclosure, the one or more bits in the DCI transmitted through the first PDCCH may be used to indicate the UE to monitor the seventh PDCCH having the same DCI format as the first PDCCH or having the specific DCI format within the first slot subsequent to the subsequent N slots in at least one of the followings. The one or more bits in the DCI in a first DCI format or a second DCI format transmitted through the first PDCCH may be used to indicate the UE to monitor the seventh PDCCH having the first DCI format or the second DCI format within the first slot subsequent to the subsequent N slots. The one or more bits in the DCI in the first DCI format or a third DCI format transmitted through the first PDCCH may be used to indicate the UE to monitor the seventh PDCCH having the first DCI format or the third DCI format within the first slot subsequent to the subsequent N slots. The one or more bits in the DCI in the second DCI format or a fourth DCI format transmitted through the first PDCCH may be used to indicate the UE to monitor the seventh PDCCH having the second DCI format or the fourth DCI format within the first slot subsequent to the subsequent N slots. The one or more bits in the DCI in the second DCI format or the fourth DCI format transmitted through the first PDCCH may be used to indicate the UE to monitor the seventh PDCCH having the first DCI format or the third DCI format within the first slot subsequent to the subsequent N slots. The one or more bits in the DCI in the first DCI format or the third DCI format transmitted through the first PDCCH may be used to indicate the UE to monitor the seventh PDCCH having the second DCI format or the fourth DCI format within the first slot subsequent to the subsequent N slots. The one or more bits in the DCI in the first DCI format, the second DCI format, the third DCI format or the fourth DCI format transmitted through the first PDCCH may be used to indicate the UE to monitor the seventh PDCCH having the first DCI format, the second DCI format, the third DCI format or the fourth DCI format within the first slot subsequent to the subsequent N slots. The one or more bits in the DCI in a fifth DCI format transmitted through the first PDCCH may be used to indicate the UE to monitor the seventh PDCCH having the fifth DCI format within the first slot subsequent to the subsequent N slots.

The first DCI format may be used to schedule physical uplink shared channels for one cell. The second DCI format may be used to schedule physical downlink shared channels for one cell. The third DCI format may be used to schedule physical uplink shared channels for one cell. The fourth DCI format may be used to schedule physical downlink shared channels for one cell. The fifth DCI format may be used to notify a group of slot formats of the UE.

In a possible embodiment of the present disclosure, the first slot subsequent to the subsequent N slots may be a first slot that meets the monitoring periodicity and the offset value configured by the network side device subsequent to the subsequent N slots that meets the monitoring periodicity and the offset value configured by the network side device, or a first downlink slot that meets the monitoring periodicity and the offset value configured by the network side device subsequent to the subsequent N slots that meets the monitoring periodicity and the offset value configured by the network side device.

In a possible embodiment of the present disclosure, a conventional DCI format may be reused by the DCI, i.e., it may be achieved through changing a function of bits in the conventional DCI, or the DCI may be in a new DCI format, i.e., it may be achieved through designing a new DCI format.

In a possible embodiment of the present disclosure, when the one or more bits in the DCI transmitted through the first PDCCH indicates the PDCCH to be monitored, the one or more bits in the DCI transmitted through the first PDCCH may be used to indicate a default monitoring behavior of the UE for monitoring the PDCCH. Further, the default monitoring behavior may at least include monitoring, by the UE, the PDCCH within a next slot or downlink slot that meets the monitoring periodicity and the offset value configured by the network side device.

In Mode 2, the one or more bits in the DCI transmitted through the first PDCCH may be used to indicate the UE not to monitor the third PDCCH having the same RNTI as the first PDCCH or having the specific RNTI within the subsequent N slots.

For example, the one or more bits in the DCI transmitted through the first third PDCCH having a first RNTI may be used to indicate the UE not to monitor the third PDCCH having the first RNTI within the subsequent N slots.

For another example, the one or more bits in the DCI transmitted through the first third PDCCH having the first RNTI may be used to indicate the UE not to monitor the third PDCCH having a second RNTI within the subsequent N slots.

In the embodiments of the present disclosure, the RNTI may include any one of a C-RNTI, a TC-RNTI, an SI-RNTI, a P-RNTI, an SPS-RNTI, a CS-RNTI, an INT-RNTI, a TPC-SRS-RNTI, a TPC-PUSCH-RNTI, a TPC-PUCCH-RNTI, an SP-CSI-RNTI, an RA-RNTI and an SFI-RNTI.

The first RNTI and the second RNTI may belong to the above-mentioned types of RNTIs, and the first RNTI may be different from the second RNTI.

In Mode 3, the one or more bits in the DCI transmitted through the first PDCCH may be used to indicate the UE not to monitor the fourth PDCCH having the same SS as the first PDCCH or having the specific SS within the subsequent N slots.

For example, the DCI transmitted through the first PDCCH having a first SS may be used to indicate the UE not to monitor the fourth PDCCH having the first SS within the subsequent N slots.

For another example, the DCI transmitted through the first PDCCH having the first SS may be used to indicate the UE not to monitor the fourth PDCCH having a second SS within the subsequent N slots.

In Mode 4, the one or more bits in the DCI transmitted through the first PDCCH may be used to indicate the UE not to monitor the fifth PDCCH having the same SS type as the first PDCCH or having the specific SS type within the subsequent N slots in at least one of the followings.

(a) The one or more bits in the DCI transmitted through the first PDCCH having a first common SS type may be used to indicate the UE not to monitor the fifth PDCCH having the first common SS type within the subsequent N slots, and the first common SS type may be a common SS type 0 or a common SS type 0A.

(b) The one or more bits in the DCI transmitted through the first PDCCH having a second common SS type may be used to indicate the UE not to monitor the fifth PDCCH having the second common SS type within the subsequent N slots, and the second common SS type may be a common SS type 1.

(c) The one or more bits in the DCI transmitted through the first PDCCH having a third common SS type may be used to indicate the UE not to monitor the fifth PDCCH having the third common SS type within the subsequent N slots, and the third common SS type may be a common SS type 2.

(d) The one or more bits in the DCI transmitted through the first PDCCH having a fourth common SS type may be used to indicate the UE not to monitor the fifth PDCCH having the fourth common SS type within the subsequent N slots, and the fourth common SS type may be a common SS type 3.

(e) The one or more bits in the DCI transmitted through the first PDCCH having a UE SS may be used to indicate the UE not to monitor the fifth PDCCH having the UE SS type within the subsequent N slots.

(f) The one or more bits in the DCI transmitted through the first PDCCH having the first SS type may be used to indicate the UE not to monitor the fifth PDCCH having the second SS type within the subsequent N slots.

The network side device in the embodiments of the present disclosure may be used to implement the above-mentioned method with a similar principle and technical effect, which will not be particularly defined herein.

Figure 6:
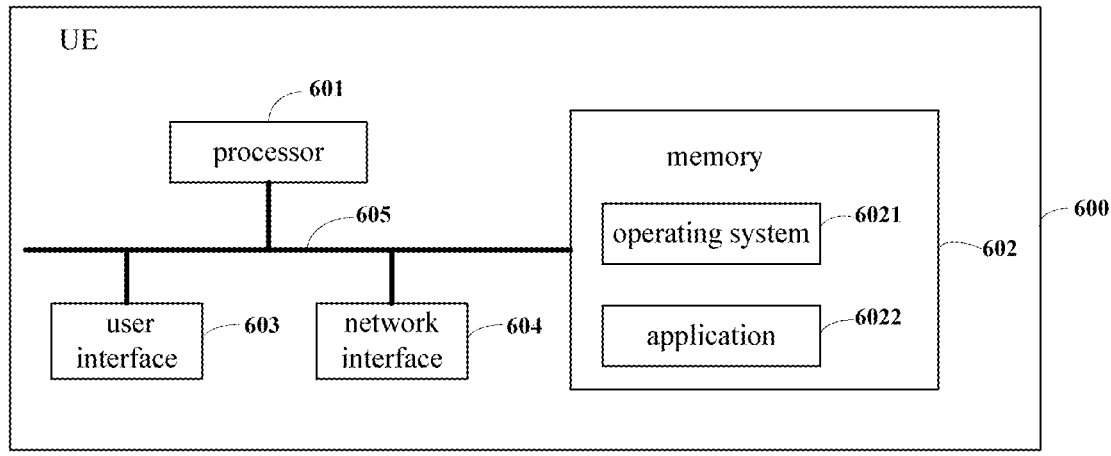
FIG. 6 is another schematic view showing the UE according to one embodiment of the present disclosure.

As shown in FIG. 6, the present disclosure further provides in some embodiments a UE 600, which includes at least one processor 601, a memory 602, at least one network interface 604 and a user interface. The components of the UE 600 may be coupled together through a bus system 605.

It should be appreciated that, the bus system 605 is configured to achieve connection and communication among the components. Apart from a data bus, the bus system 605 may further include a power source bus, a control bus and a state signal bus. For clarification, all these buses in FIG. 6 may be collectively called as bus system 605.

The user interface 603 may include a display, a keyboard or a pointing device (e.g., mouse, track ball, touch plate or touch panel).

It should be appreciated that, the memory 602 may include a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but not restrictively, the RAM may include static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 602 intends to include, but not limited to, the above-mentioned and any other appropriate memories.

In some embodiments of the present disclosure, the following elements may be stored in the memory 602: an executable module or data structure, a subset or an extended set thereof, an operating system 6021 and an application 6022.

The operating system 6021 may include various system programs, e.g., a framework layer, a core layer and a driving layer, so as to implement various basic services and process hardware-based tasks. The application 6022 may include various applications, e.g., media player and browser, so as to implement various application services. The programs for implementing the above-mentioned method may be included in the application 6022.

In the embodiments of the present disclosure, through calling a program or instruction stored in the memory 602, e.g., a program or instruction stored in the application 6022, the processor 601 is configured to: acquire one or more bits in DCI transmitted through a first PDCCH monitored by the UE, the one or more bits in the DCI of the first PDCCH indicating a PDCCH not to be monitored and/or a PDCCH to be monitored; and determine the PDCCH not to be monitored and/or the PDCCH to be monitored in accordance with the one or more bits in the DCI of the first PDCCH.

The UE in the embodiments of the present disclosure may be used to implement the above-mentioned method with a similar principle and technical effect, which will not be particularly defined herein.

Figure 7:
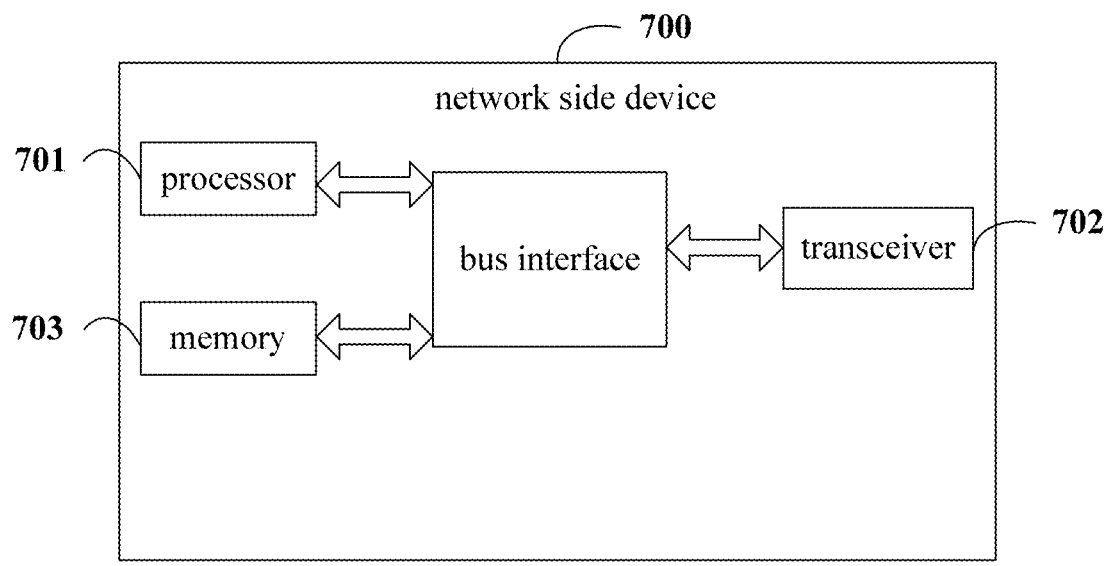
FIG. 7 is another showing the network side device according to one embodiment of the present disclosure.

As shown in FIG. 7, the present disclosure further provides in some embodiments a network side device 700 which includes a processor 701, a transceiver 702, a memory 703, a user interface 704 and a bus interface.

The processor 701 may take charge of managing the bus architecture as well as general processings. The memory 703 may store therein data for the operation of the processor 701.

In the embodiments of the present disclosure, the network side device 700 may further include a computer program stored in the memory 703 and executed by the processor 701. The computer program is executed by the processor 701 so as to configure one or more bits in DCI transmitted through a first PDCCH, the one or more bits in the DCI of the first PDCCH indicating a PDCCH not to be monitored by a UE and/or a PDCCH to be monitored by the UE.

In FIG. 7, bus architecture may include a number of buses and bridges connected to each other, so as to connect various circuits for one or more processors 701 and one or more memories 703. In addition, as is known in the art, the bus architecture may be used to connect any other circuits, such as a circuit for a peripheral device, a circuit for a voltage stabilizer and a power management circuit. The bus interface may be provided, and the transceiver 702 may consist of a plurality of elements, i.e., a transmitter and a receiver for communication with any other devices over a transmission medium.

The steps of the methods or algorithm described in conjunction with the contents mentioned hereinabove may be implemented through hardware, or implemented by a processor executing instructions. The instructions may consist of corresponding modules stored in an RAM, a flash memory, an ROM, an EPROM, an EEPROM, a register, a hard disk, a mobile hard disk, a read-only optic disk, or any other known storage medium. Illustratively, the storage medium may be coupled to the processor, so that the processor is capable of reading information from the storage medium and writing information into the storage medium. Of course, the storage medium may be a component of the processor. The processor and the storage medium may be located in an application specific integrated circuit (Application Specific Integrated Circuit, ASIC). In addition, the ASIC may be located in an interface device of a core network. Of course, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Downlink Control Channel (PDCCH) monitoring method performed by a User Equipment (UE), the PDCCH monitoring method comprising:
    acquiring one or more bits in Downlink Control Information (DCI) transmitted through a first PDCCH monitored by the UE, the one or more bits in the DCI of the first PDCCH indicating a not-to-be-monitored PDCCH and/or a to-be-monitored PDCCH; and
    determining the not-to-be-monitored PDCCH and/or the to-be-monitored PDCCH in accordance with the one or more bits in the DCI of the first PDCCH,
    wherein the one or more bits in the DCI transmitted through the first PDCCH are used to indicate a not-to-be-monitored PDCCH in at least one of the followings:
    the one or more bits in the DCI transmitted through the first PDCCH are used to indicate the UE not to monitor a second PDCCH having a same DCI format as the first PDCCH or having a specific DCI format within subsequent N slots;
    the one or more bits in the DCI transmitted through the first PDCCH are used to indicate the UE not to monitor a third PDCCH having a same Radio Network Temporary Identity (RNTI) as the first PDCCH or having a specific RNTI within subsequent N slots;
    the one or more bits in the DCI transmitted through the first PDCCH are used to indicate the UE not to monitor a fourth PDCCH having a same Search Space (SS) as the first PDCCH or having a specific SS within subsequent N slots;
    the one or more bits in the DCI transmitted through the first PDCCH are used to indicate the UE not to monitor a fifth PDCCH having a same SS type as the first PDCCH or having a specific SS type within subsequent N slots; or
    the one or more bits in the DCI transmitted through the first PDCCH are used to indicate the UE not to monitor a sixth PDCCH having a same Control-Resource Set (CORESET) as the first PDCCH or having a specific CORESET within subsequent N slots,
    wherein N is an integer greater than or equal to 1; and/or
    wherein the one or more bits in the DCI transmitted through the first PDCCH are used to indicate a to-be-monitored PDCCH in at least one of the followings:
    the one or more bits in the DCI transmitted through the first PDCCH are used to indicate the UE to monitor a seventh PDCCH having a same DCI format as the first PDCCH or having a specific DCI format within a first slot subsequent to the subsequent N slots;
    the one or more bits in the DCI transmitted through the first PDCCH are used to indicate the UE to monitor an eighth PDCCH having a same RNTI as the first PDCCH or having a specific RNTI within the first slot subsequent to the subsequent N slots;
    the one or more bits in the DCI transmitted through the first PDCCH are used to indicate the UE to monitor a ninth PDCCH having a same SS as the first PDCCH or having a specific SS within the first slot subsequent to the subsequent N slots;
    the one or more bits in the DCI transmitted through the first PDCCH are used to indicate the UE to monitor a tenth PDCCH having a same SS type as the first PDCCH or having a specific SS type within the first slot subsequent to the subsequent N slots; or
    the one or more bits in the DCI transmitted through the first PDCCH are used to indicate the UE to monitor an eleventh PDCCH having a same CORESET as the first PDCCH or having a specific CORESET within the first slot subsequent to the subsequent N slots,
    wherein N is an integer greater than or equal to 1.

2. The PDCCH monitoring method according to claim 1, further comprising:
    receiving indication information from a network side device, wherein the indication information is used to indicate the UE to monitor the first PDCCH or indicate that the first PDCCH has been configured by the network side device for the UE, or the indication information is used to indicate the UE not to monitor the first PDCCH or indicate that the first PDCCH has not been configured by the network side device for the UE.

3. The PDCCH monitoring method according to claim 1, wherein the one or more bits in the DCI transmitted through the first PDCCH are used to indicate the UE not to monitor the second PDCCH having the same DCI format as the first PDCCH or having the specific DCI format within the subsequent N slots in at least one of the followings:
    the one or more bits in the DCI in a first DCI format or a second DCI format transmitted through the first PDCCH are used to indicate the UE not to monitor the second PDCCH having the first DCI format or the second DCI format within the subsequent N slots;
    the one or more bits in the DCI in the first DCI format or a third DCI format transmitted through the first PDCCH are used to indicate the UE not to monitor the second PDCCH having the first DCI format or the third DCI format within the subsequent N slots;

the one or more bits in the DCI in the second DCI format or a fourth DCI format transmitted through the first PDCCH are used to indicate the UE not to monitor the second PDCCH having the second DCI format or the fourth DCI format within the subsequent N slots;

the one or more bits in the DCI in the second DCI format or the fourth DCI format transmitted through the first PDCCH are used to indicate the UE not to monitor the second PDCCH having the first DCI format or the third DCI format within the subsequent N slots;

the one or more bits in the DCI in the first DCI format or the third DCI format transmitted through the first PDCCH are used to indicate the UE not to monitor the second PDCCH having the second DCI format or the fourth DCI format within the subsequent N slots;

the one or more bits in the DCI in the first DCI format, the second DCI format, the third DCI format or the fourth DCI format transmitted through the first PDCCH are used to indicate the UE not to monitor the second PDCCH having the first DCI format, the second DCI format, the third DCI format or the fourth DCI format within the subsequent N slots; or the one or more bits in the DCI in a fifth DCI format transmitted through the first PDCCH are used to indicate the UE not to monitor the second PDCCH having the fifth DCI format within subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

4. The PDCCH monitoring method according to claim 1, wherein the subsequent N slots comprise subsequent N slots which meet a monitoring periodicity and an offset value configured by the network side device, or subsequent N downlink slots which meet the monitoring periodicity and the offset value configured by the network side device.

5. The PDCCH monitoring method according to claim 1, wherein the one or more bits in the DCI transmitted through the first PDCCH are used to indicate the UE to monitor the seventh PDCCH having the same DCI format as the first PDCCH or having the specific DCI format within the first slot subsequent to the subsequent N slots in at least one of the followings:

the one or more bits in the DCI in a first DCI format or a second DCI format transmitted through the first PDCCH are used to indicate the UE to monitor the seventh PDCCH having the first DCI format or the second DCI format within the first slot subsequent to the subsequent N slots;

the one or more bits in the DCI in the first DCI format or a third DCI format transmitted through the first PDCCH are used to indicate the UE to monitor the seventh PDCCH having the first DCI format or the third DCI format within the first slot subsequent to the subsequent N slots;

the one or more bits in the DCI in the second DCI format or a fourth DCI format transmitted through the first PDCCH are used to indicate the UE to monitor the seventh PDCCH having the second DCI format or the fourth DCI format within the first slot subsequent to the subsequent N slots;

the one or more bits in the DCI in the second DCI format or the fourth DCI format transmitted through the first PDCCH are used to indicate the UE to monitor the seventh PDCCH having the first DCI format or the third DCI format within the first slot subsequent to the subsequent N slots;

the one or more bits in the DCI in the first DCI format or the third DCI format transmitted through the first PDCCH are used to indicate the UE to monitor the second PDCCH having the second DCI format or the fourth DCI format within the first slot subsequent to the subsequent N slots;

the one or more bits in the DCI in the first DCI format, the second DCI format, the third DCI format or the fourth DCI format transmitted through the first PDCCH are used to indicate the UE to monitor the seventh PDCCH having the first DCI format, the second DCI format, the third DCI format or the fourth DCI format within the first slot subsequent to the subsequent N slots; or the one or more bits in the DCI in a fifth DCI format transmitted through the first PDCCH are used to indicate the UE to monitor the seventh PDCCH having the fifth DCI format within the first slot subsequent to the subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

6. The PDCCH monitoring method according to claim 1, wherein the first slot subsequent to the subsequent N slots is a first slot that meets the monitoring periodicity and the offset value configured by the network side device subsequent to the subsequent N slots that meets the monitoring periodicity and the offset value configured by the network side device, or a first downlink slot that meets the monitoring periodicity and the offset value configured by the network side device subsequent to the subsequent N slots that meets the monitoring periodicity and the offset value configured by the network side device.

7. The PDCCH monitoring method according to claim 1, wherein when the one or more bits in the DCI transmitted through the first PDCCH indicates the to-be-monitored PDCCH, the one or more bits in the DCI transmitted through the first PDCCH are used to indicate a default monitoring behavior of the UE for monitoring the PDCCH, wherein the default monitoring behavior at least comprises monitoring, by the UE, the PDCCH within a next slot or downlink slot that meets the monitoring periodicity and the offset value configured by the network side device.

8. The PDCCH monitoring method according to claim 1, wherein the one or more bits in the DCI transmitted through the first PDCCH are used to indicate the UE not to monitor the fifth PDCCH having the same SS type as the first PDCCH or having the specific SS type within the subsequent N slots in at least one of the followings:

the one or more bits in the DCI transmitted through the first PDCCH having a first common SS type are used to indicate the UE not to monitor the fifth PDCCH having the first common SS type within the subsequent N slots;

the one or more bits in the DCI transmitted through the first PDCCH having a second common SS type are used to indicate the UE not to monitor the fifth PDCCH having the second common SS type within the subsequent N slots;

the one or more bits in the DCI transmitted through the first PDCCH having a third common SS type are used to indicate the UE not to monitor the fifth PDCCH having the third common SS type within the subsequent N slots;

the one or more bits in the DCI transmitted through the first PDCCH having a fourth common SS type are used to indicate the UE not to monitor the fifth PDCCH having the fourth common SS type within the subsequent N slots;

the one or more bits in the DCI transmitted through the first PDCCH having a UE-Specific Search Space (UE SS) are used to indicate the UE not to monitor the fifth PDCCH having the UE SS type within the subsequent N slots; or the one or more bits in the DCI transmitted through the first PDCCH having the first SS type are used to indicate the UE not to monitor the fifth PDCCH having the second SS type within the subsequent N slots.

9. A PDCCH configuration method performed by a network side device, the PDCCH configuration method comprising:

configuring one or more bits in DCI transmitted through a first PDCCH, the one or more bits in the DCI of the first PDCCH indicating a not-to-be-monitored PDCCH by a UE and/or a to-be-monitored PDCCH by the UE, wherein the one or more bits in the DCI transmitted through the first PDCCH are used to indicate a not-to-be-monitored PDCCH in at least one of the followings:

the one or more bits in the DCI transmitted through the first PDCCH are used to indicate the UE not to monitor a second PDCCH having a same DCI format as the first PDCCH or having a specific DCI format within subsequent N slots;

the one or more bits in the DCI transmitted through the first PDCCH are used to indicate the UE not to monitor a third PDCCH having a same RNTI as the first PDCCH or having a specific RNTI within subsequent N slots;

the one or more bits in the DCI transmitted through the first PDCCH are used to indicate the UE not to monitor a fourth PDCCH having a same SS as the first PDCCH or having a specific SS within subsequent N slots;

the one or more bits in the DCI transmitted through the first PDCCH are used to indicate the UE not to monitor a fifth PDCCH having a same SS type as the first PDCCH or having a specific SS type within subsequent N slots; or the one or more bits in the DCI transmitted through the first PDCCH are used to indicate the UE not to monitor a sixth PDCCH having a same CORESET as the first PDCCH or having a specific CORESET within subsequent N slots, wherein N is an integer greater than or equal to 1; and/or wherein the one or more bits in the DCI transmitted through the first PDCCH are used to indicate a to-be-monitored PDCCH in at least one of the followings:

the one or more bits in the DCI transmitted through the first PDCCH are used to indicate the UE to monitor a seventh PDCCH having a same DCI format as the first PDCCH or having a specific DCI format within a first slot subsequent to the subsequent N slots;

the one or more bits in the DCI transmitted through the first PDCCH are used to indicate the UE to monitor an eighth PDCCH having a same RNTI as the first PDCCH or having a specific RNTI within the first slot subsequent to the subsequent N slots;

the one or more bits in the DCI transmitted through the first PDCCH are used to indicate the UE to monitor a ninth PDCCH having a same SS as the first PDCCH or having a specific SS within the first slot subsequent to the subsequent N slots;

the one or more bits in the DCI transmitted through the first PDCCH are used to indicate the UE to monitor a tenth PDCCH having a same SS type as the first PDCCH or having a specific SS type within the first slot subsequent to the subsequent N slots; or the one or more bits in the DCI transmitted through the first PDCCH are used to indicate the UE to monitor an eleventh PDCCH having a same CORESET as the first PDCCH or having a specific CORESET within the first slot subsequent to the subsequent N slots, wherein N is an integer greater than or equal to 1.

10. The PDCCH configuration method according to claim 9, further comprising:

transmitting indication information to the UE, wherein the indication information is used to indicate the UE to monitor the first PDCCH or indicate that the first PDCCH has been configured by the network side device for the UE, or the indication information are used to indicate the UE not to monitor the first PDCCH or indicate that the first PDCCH has not been configured by the network side device for the UE.

11. The PDCCH configuration method according to claim 9, wherein the one or more bits in the DCI transmitted through the first PDCCH are used to indicate the UE not to monitor the second PDCCH having the same DCI format as the first PDCCH or having the specific DCI format within the subsequent N slots in at least one of the followings:

the one or more bits in the DCI in a first DCI format or a second DCI format transmitted through the first PDCCH are used to indicate the UE not to monitor the second PDCCH having the first DCI format or the second DCI format within the subsequent N slots;

the one or more bits in the DCI in the first DCI format or a third DCI format transmitted through the first PDCCH are used to indicate the UE not to monitor the second PDCCH having the first DCI format or the third DCI format within the subsequent N slots;

the one or more bits in the DCI in the second DCI format or a fourth DCI format transmitted through the first PDCCH are used to indicate the UE not to monitor the second PDCCH having the second DCI format or the fourth DCI format within the subsequent N slots;

the one or more bits in the DCI in the second DCI format or the fourth DCI format transmitted through the first PDCCH are used to indicate the UE not to monitor the second PDCCH having the first DCI format or the third DCI format within the subsequent N slots;

the one or more bits in the DCI in the first DCI format or the third DCI format transmitted through the first PDCCH are used to indicate the UE not to monitor the second PDCCH having the second DCI format or the fourth DCI format within the subsequent N slots;

the one or more bits in the DCI in the first DCI format, the second DCI format, the third DCI format or the fourth DCI format transmitted through the first PDCCH are used to indicate the UE not to monitor the second PDCCH having the first DCI format, the second DCI format, the third DCI format or the fourth DCI format within the subsequent N slots; or the one or more bits in the DCI in a fifth DCI format transmitted through the first PDCCH are used to indicate the UE not to monitor the second PDCCH having the fifth DCI format within subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

12. The PDCCH configuration method according to claim 9, wherein the one or more bits in the DCI transmitted through the first PDCCH are used to indicate the UE to monitor the seventh PDCCH having the same DCI format as the first PDCCH or having the specific DCI format within the first slot subsequent to the subsequent N slots in at least one of the followings:

the one or more bits in the DCI in a first DCI format or a second DCI format transmitted through the first PDCCH are used to indicate the UE to monitor the seventh PDCCH having the first DCI format or the second DCI format within the first slot subsequent to the subsequent N slots;

the one or more bits in the DCI in the first DCI format or a third DCI format transmitted through the first PDCCH are used to indicate the UE to monitor the seventh PDCCH having the first DCI format or the third DCI format within the first slot subsequent to the subsequent N slots;

the one or more bits in the DCI in the second DCI format or a fourth DCI format transmitted through the first PDCCH are used to indicate the UE to monitor the seventh PDCCH having the second DCI format or the fourth DCI format within the first slot subsequent to the subsequent N slots;

the one or more bits in the DCI in the second DCI format or the fourth DCI format transmitted through the first PDCCH are used to indicate the UE to monitor the seventh PDCCH having the first DCI format or the third DCI format within the first slot subsequent to the subsequent N slots;

the one or more bits in the DCI in the first DCI format or the third DCI format transmitted through the first PDCCH are used to indicate the UE to monitor the second PDCCH having the second DCI format or the fourth DCI format within the first slot subsequent to the subsequent N slots;

the one or more bits in the DCI in the first DCI format, the second DCI format, the third DCI format or the fourth DCI format transmitted through the first PDCCH are used to indicate the UE to monitor the seventh PDCCH having the first DCI format, the second DCI format, the third DCI format or the fourth DCI format within the first slot subsequent to the subsequent N slots; or the one or more bits in the DCI in a fifth DCI format transmitted through the first PDCCH are used to indicate the UE to monitor the seventh PDCCH having the fifth DCI format within the first slot subsequent to the subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

13. The PDCCH configuration method according to claim 9, wherein when the one or more bits in the DCI transmitted through the first PDCCH indicates the to-be-monitored PDCCH, the one or more bits in the DCI transmitted through the first PDCCH are used to indicate a default monitoring behavior of the UE for monitoring the PDCCH, wherein the default monitoring behavior at least comprises monitoring, by the UE, the PDCCH within a next slot or downlink slot that meets the monitoring periodicity and the offset value configured by the network side device.

14. The PDCCH configuration method according to claim 9, wherein the one or more bits in the DCI transmitted through the first PDCCH are used to indicate the UE not to monitor the fifth PDCCH having the same SS type as the first PDCCH or having the specific SS type within the subsequent N slots in at least one of the followings:

the one or more bits in the DCI transmitted through the first PDCCH having a first common SS type are used to indicate the UE not to monitor the fifth PDCCH having the first common SS type within the subsequent N slots;

the one or more bits in the DCI transmitted through the first PDCCH having a second common SS type are used to indicate the UE not to monitor the fifth PDCCH having the second common SS type within the subsequent N slots;

the one or more bits in the DCI transmitted through the first PDCCH having a third common SS type are used to indicate the UE not to monitor the fifth PDCCH having the third common SS type within the subsequent N slots;

the one or more bits in the DCI transmitted through the first PDCCH having a fourth common SS type are used to indicate the UE not to monitor the fifth PDCCH having the fourth common SS type within the subsequent N slots;

the one or more bits in the DCI transmitted through the first PDCCH having a UE SS are used to indicate the UE not to monitor the fifth PDCCH having the UE SS type within the subsequent N slots; or the one or more bits in the DCI transmitted through the first PDCCH having the first SS type are used to indicate the UE not to monitor the fifth PDCCH having the second SS type within the subsequent N slots.

15. A network side device, comprising a processor, a memory, and a computer program stored in the memory and executed by the processor, wherein the processor is configured to execute the computer program so as to implement the PDCCH configuration method according to claim 9.

16. A User Equipment (UE), comprising a processor, a memory, and a computer program stored in the memory and executed by the processor, wherein the processor is configured to execute the computer program so as to implement a Physical Downlink Control Channel (PDCCH) monitoring method for the UE, the PDCCH monitoring method comprising:

acquiring one or more bits in Downlink Control Information (DCI) transmitted through a first PDCCH monitored by the UE, the one or more bits in the DCI of the first PDCCH indicating a not-to-be-monitored PDCCH and/or a to-be-monitored PDCCH; and determining the not-to-be-monitored PDCCH and/or the to-be-monitored PDCCH in accordance with the one or more bits in the DCI of the first PDCCH, wherein the one or more bits in the DCI transmitted through the first PDCCH are used to indicate a not-to-be-monitored PDCCH in at least one of the followings:

the one or more bits in the DCI transmitted through the first PDCCH are used to indicate the UE not to monitor a second PDCCH having a same DCI format as the first PDCCH or having a specific DCI format within subsequent N slots;

the one or more bits in the DCI transmitted through the first PDCCH are used to indicate the UE not to monitor a third PDCCH having a same Radio Network Temporary Identity (RNTI) as the first PDCCH or having a specific RNTI within subsequent N slots;

the one or more bits in the DCI transmitted through the first PDCCH are used to indicate the UE not to monitor a fourth PDCCH having a same Search Space (SS) as the first PDCCH or having a specific SS within subsequent N slots;

the one or more bits in the DCI transmitted through the first PDCCH are used to indicate the UE not to monitor a fifth PDCCH having a same SS type as the first PDCCH or having a specific SS type within subsequent N slots; or the one or more bits in the DCI transmitted through the first PDCCH are used to indicate the UE not to monitor a sixth PDCCH having a same Control-Resource Set (CORESET) as the first PDCCH or having a specific CORESET within subsequent N slots, wherein N is an integer greater than or equal to 1; and/or wherein the one or more bits in the DCI transmitted through the first PDCCH are used to indicate a to-be-monitored PDCCH in at least one of the followings:

the one or more bits in the DCI transmitted through the first PDCCH are used to indicate the UE to monitor a seventh PDCCH having a same DCI format as the first PDCCH or having a specific DCI format within a first slot subsequent to the subsequent N slots;

the one or more bits in the DCI transmitted through the first PDCCH are used to indicate the UE to monitor an eighth PDCCH having a same RNTI as the first PDCCH or having a specific RNTI within the first slot subsequent to the subsequent N slots;

the one or more bits in the DCI transmitted through the first PDCCH are used to indicate the UE to monitor a ninth PDCCH having a same SS as the first PDCCH or having a specific SS within the first slot subsequent to the subsequent N slots;

the one or more bits in the DCI transmitted through the first PDCCH are used to indicate the UE to monitor a tenth PDCCH having a same SS type as the first PDCCH or having a specific SS type within the first slot subsequent to the subsequent N slots; or the one or more bits in the DCI transmitted through the first PDCCH are used to indicate the UE to monitor an eleventh PDCCH having a same CORESET as the first PDCCH or having a specific CORESET within the first slot subsequent to the subsequent N slots, wherein N is an integer greater than or equal to 1.

17. The UE according to claim 16, wherein the PDCCH monitoring method further comprises:

receiving indication information from a network side device, wherein the indication information is used to indicate the UE to monitor the first PDCCH or indicate that the first PDCCH has been configured by the network side device for the UE, or the indication information is used to indicate the UE not to monitor the first PDCCH or indicate that the first PDCCH has not been configured by the network side device for the UE.

18. The UE according to claim 16, wherein the one or more bits in the DCI transmitted through the first PDCCH are used to indicate the UE not to monitor the second PDCCH having the same DCI format as the first PDCCH or having the specific DCI format within the subsequent N slots in at least one of the followings:

the one or more bits in the DCI in a first DCI format or a second DCI format transmitted through the first PDCCH are used to indicate the UE not to monitor the second PDCCH having the first DCI format or the second DCI format within the subsequent N slots;

the one or more bits in the DCI in the first DCI format or a third DCI format transmitted through the first PDCCH are used to indicate the UE not to monitor the second PDCCH having the first DCI format or the third DCI format within the subsequent N slots;

the one or more bits in the DCI in the second DCI format or a fourth DCI format transmitted through the first PDCCH are used to indicate the UE not to monitor the second PDCCH having the second DCI format or the fourth DCI format within the subsequent N slots;

the one or more bits in the DCI in the second DCI format or the fourth DCI format transmitted through the first PDCCH are used to indicate the UE not to monitor the second PDCCH having the first DCI format or the third DCI format within the subsequent N slots;

the one or more bits in the DCI in the first DCI format or the third DCI format transmitted through the first PDCCH are used to indicate the UE not to monitor the second PDCCH having the second DCI format or the fourth DCI format within the subsequent N slots;

the one or more bits in the DCI in the first DCI format, the second DCI format, the third DCI format or the fourth DCI format transmitted through the first PDCCH are used to indicate the UE not to monitor the second PDCCH having the first DCI format, the second DCI format, the third DCI format or the fourth DCI format within the subsequent N slots; or the one or more bits in the DCI in a fifth DCI format transmitted through the first PDCCH are used to indicate the UE not to monitor the second PDCCH having the fifth DCI format within subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

19. The UE according to claim 16, wherein the subsequent N slots comprise subsequent N slots which meet a monitoring periodicity and an offset value configured by the network side device, or subsequent N downlink slots which meet the monitoring periodicity and the offset value configured by the network side device.

20. The UE according to claim 16, wherein the one or more bits in the DCI transmitted through the first PDCCH are used to indicate the UE to monitor the seventh PDCCH having the same DCI format as the first PDCCH or having the specific DCI format within the first slot subsequent to the subsequent N slots in at least one of the followings:

the one or more bits in the DCI in a first DCI format or a second DCI format transmitted through the first PDCCH are used to indicate the UE to monitor the seventh PDCCH having the first DCI format or the second DCI format within the first slot subsequent to the subsequent N slots;

the one or more bits in the DCI in the first DCI format or a third DCI format transmitted through the first PDCCH are used to indicate the UE to monitor the seventh PDCCH having the first DCI format or the third DCI format within the first slot subsequent to the subsequent N slots;

the one or more bits in the DCI in the second DCI format or a fourth DCI format transmitted through the first PDCCH are used to indicate the UE to monitor the seventh PDCCH having the second DCI format or the fourth DCI format within the first slot subsequent to the subsequent N slots;

the one or more bits in the DCI in the second DCI format or the fourth DCI format transmitted through the first PDCCH are used to indicate the UE to monitor the seventh PDCCH having the first DCI format or the third DCI format within the first slot subsequent to the subsequent N slots;

the one or more bits in the DCI in the first DCI format or the third DCI format transmitted through the first PDCCH are used to indicate the UE to monitor the second PDCCH having the second DCI format or the fourth DCI format within the first slot subsequent to the subsequent N slots;

the one or more bits in the DCI in the first DCI format, the second DCI format, the third DCI format or the fourth DCI format transmitted through the first PDCCH are used to indicate the UE to monitor the seventh PDCCH having the first DCI format, the second DCI format, the third DCI format or the fourth DCI format within the first slot subsequent to the subsequent N slots; or the one or more bits in the DCI in a fifth DCI format transmitted through the first PDCCH are used to indicate the UE to monitor the seventh PDCCH having the fifth DCI format within the first slot subsequent to the subsequent N slots, wherein the first DCI format is used to schedule physical uplink shared channels for one cell, the second DCI format is used to schedule physical downlink shared channels for one cell, the third DCI format is used to schedule physical uplink shared channels for one cell, the fourth DCI format is used to schedule physical downlink shared channels for one cell, and the fifth DCI format is used to notify a group of slot formats of the UE.

* * * * *